United States Patent
Lee et al.

(10) Patent No.: US 10,719,317 B2
(45) Date of Patent: Jul. 21, 2020

(54) HARDWARE APPARATUSES AND METHODS RELATING TO ELEMENTAL REGISTER ACCESSES

(71) Applicant: INTEL CORPORATION, Santa Clara, CA (US)

(72) Inventors: Victor Lee, Santa Clara, CA (US); Ugonna Echeruo, Hillsboro, OR (US); George Chrysos, Portland, OR (US); Naveen Mellempudi, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/003,555

(22) Filed: Jun. 8, 2018

(65) Prior Publication Data

US 2019/0138305 A1    May 9, 2019

Related U.S. Application Data

(63) Continuation of application No. 14/582,784, filed on Dec. 24, 2014, now Pat. No. 9,996,347.

(51) Int. Cl.
*G06F 9/30* (2018.01)

(52) U.S. Cl.
CPC .................. *G06F 9/30036* (2013.01)

(58) Field of Classification Search
None
See application file for complete search history.

(56) References Cited

U.S. PATENT DOCUMENTS

| 7,434,040 B2 | 10/2008 | Bayh | |
|---|---|---|---|
| 2004/0139271 A1* | 7/2004 | Khellah | G06F 9/30141 711/1 |
| 2012/0233443 A1* | 9/2012 | Sebot | G06F 9/3001 712/208 |

OTHER PUBLICATIONS

Non-Final Office Action from U.S. Appl. No. 14/582,784, dated Jun. 7, 2017, 8 pages.
Notice of Allowance from U.S. Appl. No. 14/582,784, dated Jan. 19, 2018, 8 pages.
Restriction Requirement from U.S. Appl. No. 14/582,784, dated Jan. 26, 2017, 6 pages.

* cited by examiner

*Primary Examiner* — Corey S Faherty
(74) *Attorney, Agent, or Firm* — Nicholson De Vos Webster & Elliott LLP

(57) ABSTRACT

Methods and apparatuses relating to a vector instruction with a register operand with an elemental offset are described. In one embodiment, a hardware processor includes a decode unit to decode a vector instruction with a register operand with an elemental offset to access a first number of elements in a register specified by the register operand, wherein the first number is a total number of elements in the register minus the elemental offset, access a second number of elements in a next logical register, wherein the second number is the elemental offset, and combine the first number of elements and the second number of elements as a data vector, and an execution unit to execute the vector instruction on the data vector.

24 Claims, 17 Drawing Sheets

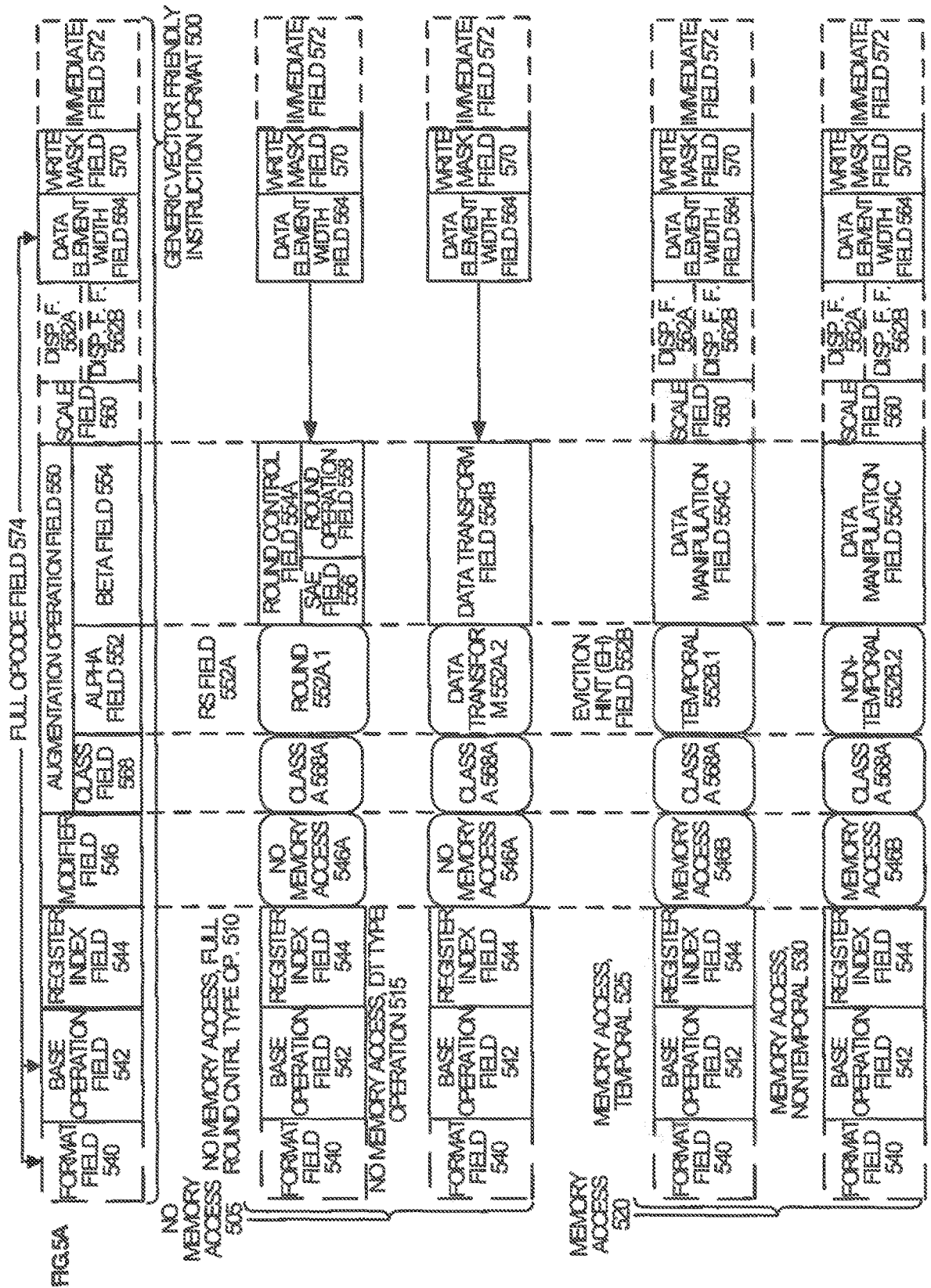

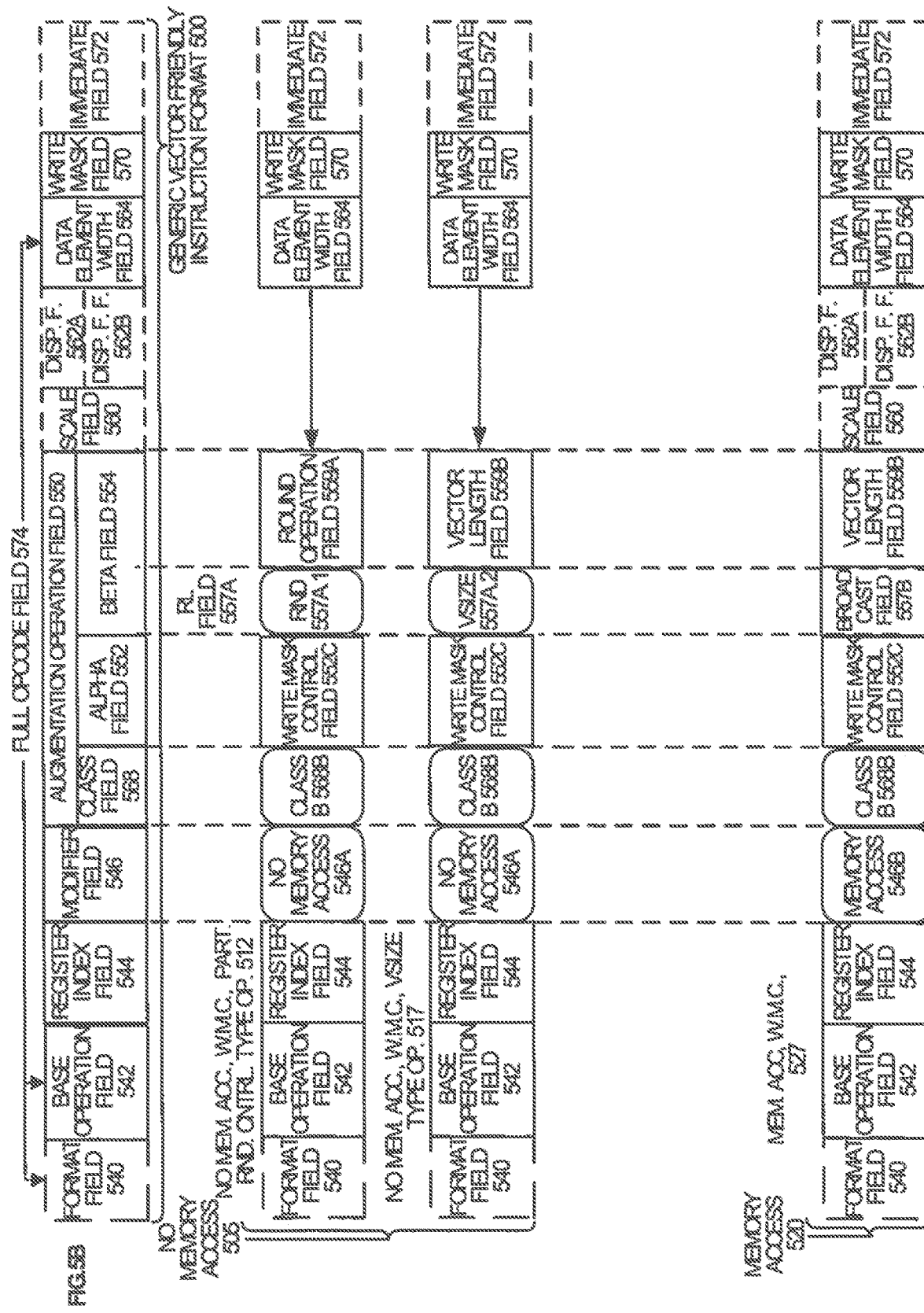

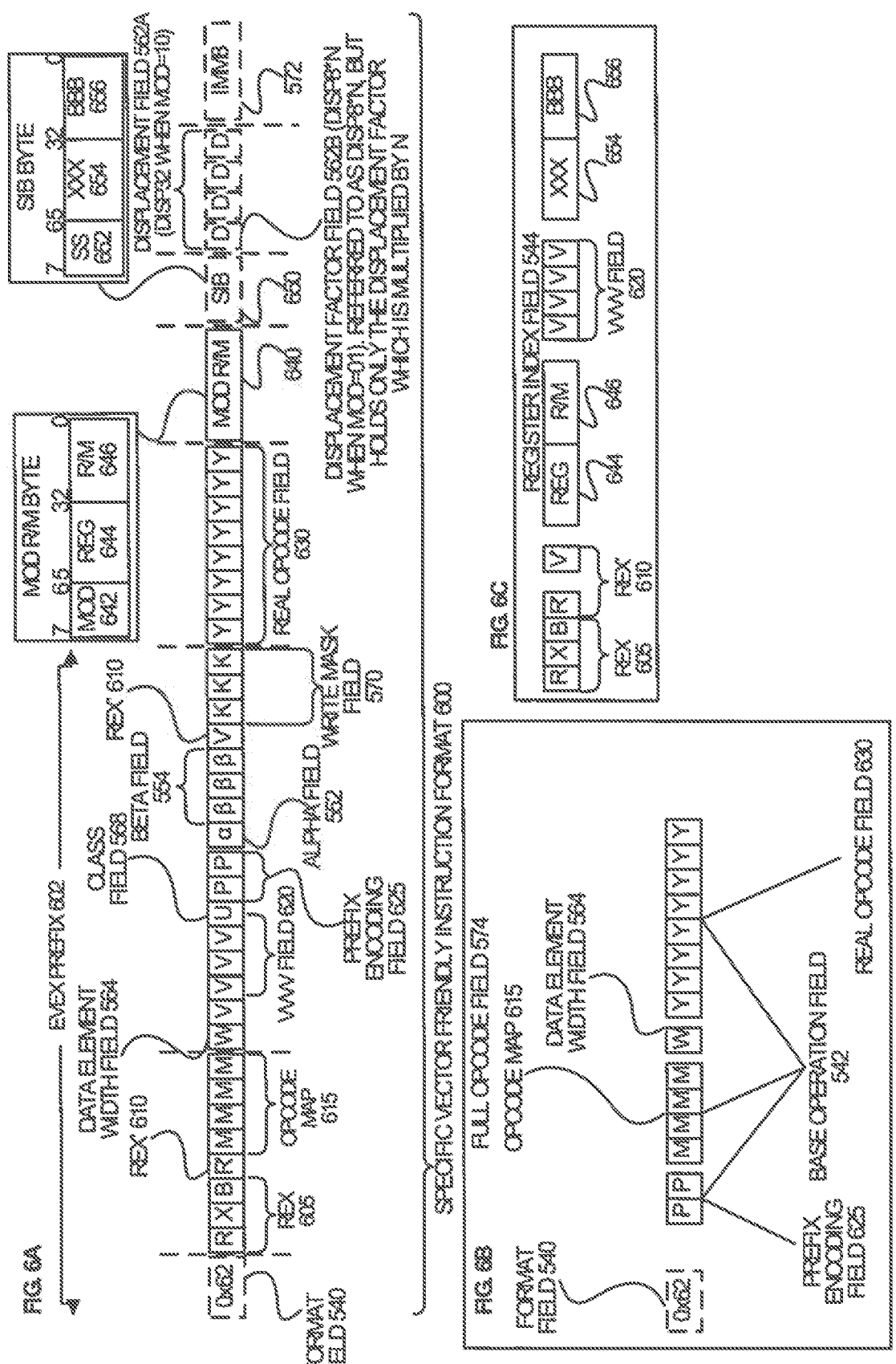

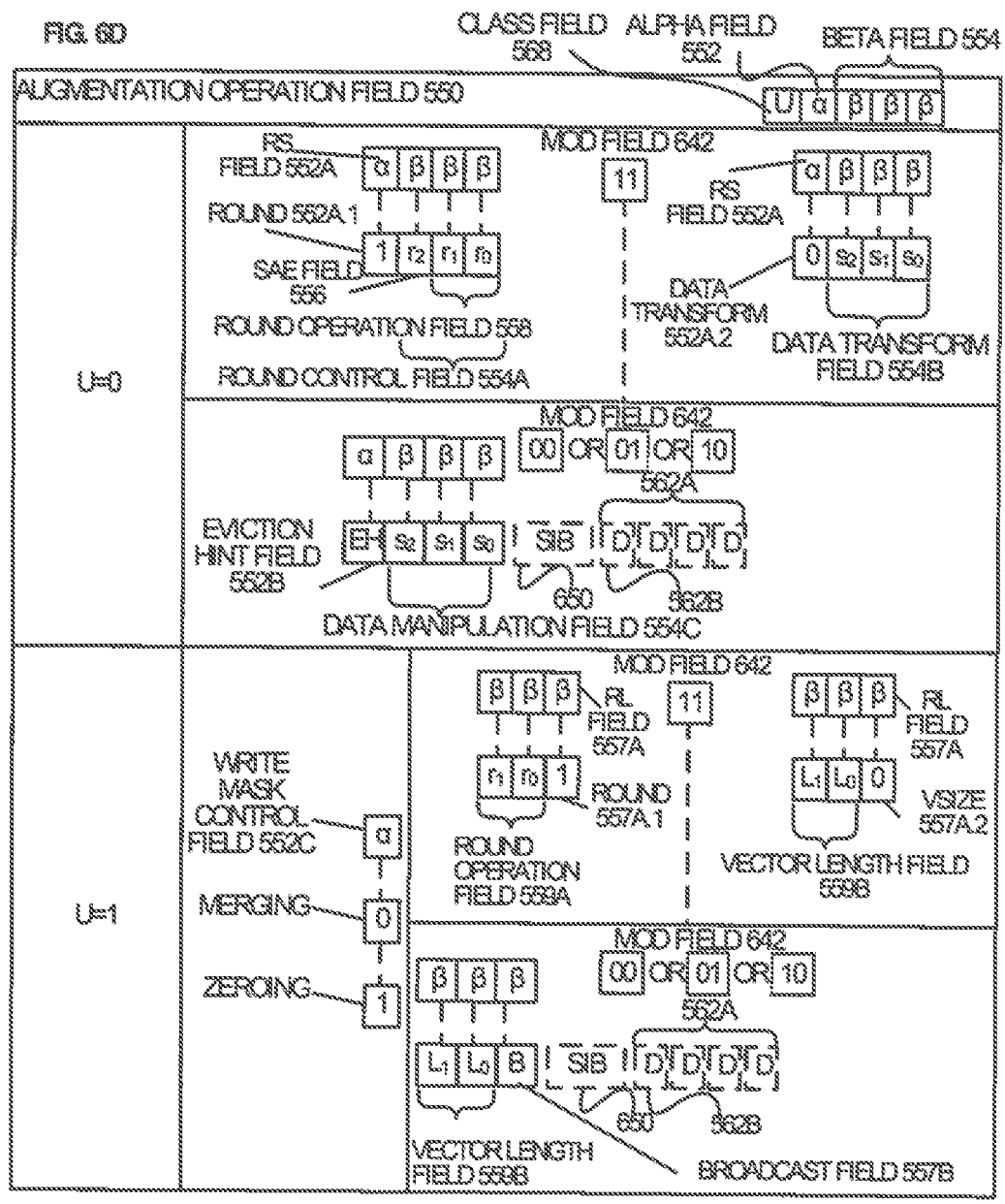

FIG. 7

SCALAR FP STACK REGISTER FILE 745
(X87FP)
80 BITS

ALIASED

MMX PACKED INT FLAT
REGISTER FILE 750
64 BITS

Write Mask Registers 715
64 BITS $k_0$
$k_7$

REGISTER ARCHITECTURE 700

General Purpose Registers 725
16 X 64 BITS

Vector Registers 710
512 BITS $xmm_0$
$xmm_{15}$
128 BITS $ymm_0$
$ymm_{15}$
256 BITS $zmm_0$
$zmm_{31}$

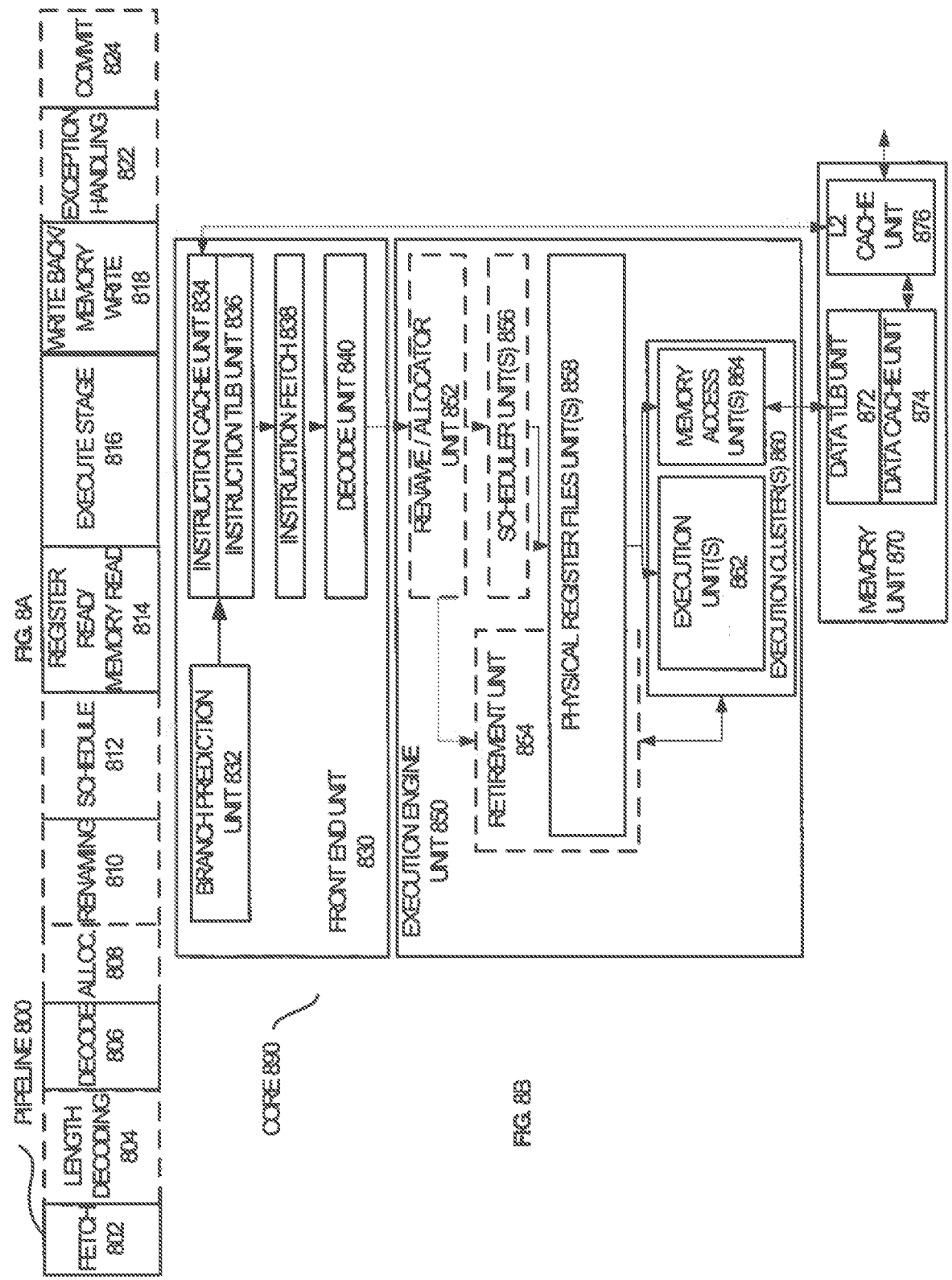

US 10,719,317 B2

HARDWARE APPARATUSES AND METHODS RELATING TO ELEMENTAL REGISTER ACCESSES

CROSS-REFERENCE TO RELATED APPLICATIONS

The present patent application is a continuation application claiming priority from U.S. patent application Ser. No. 14/582,784, filed Dec. 24, 2014, and titled: "Hardware Apparatuses and Methods Relating to Elemental Register Accesses", which is incorporated herein by reference in its entirety.

TECHNICAL FIELD

The disclosure relates generally to electronics, and, more specifically, an embodiment of the disclosure relates to elemental register accesses.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O).

BRIEF DESCRIPTION OF THE DRAWINGS

The present disclosure is illustrated by way of example and not limitation in the figures of the accompanying drawings, in which like references indicate similar elements and in which:

FIG. 5A is a block diagram illustrating a generic vector friendly instruction format and class A instruction templates thereof according to embodiments of the disclosure.

FIG. 5B is a block diagram illustrating the generic vector friendly instruction format and class B instruction templates thereof according to embodiments of the disclosure.

FIG. 6A is a block diagram illustrating fields for the generic vector friendly instruction formats in FIGS. 5A and 5B according to embodiments of the disclosure.

FIG. 6B is a block diagram illustrating the fields of the specific vector friendly instruction format in FIG. 6A that make up a full opcode field according to one embodiment of the disclosure.

FIG. 6C is a block diagram illustrating the fields of the specific vector friendly instruction format in FIG. 6A that make up a register index field according to one embodiment of the disclosure.

FIG. 6D is a block diagram illustrating the fields of the specific vector friendly instruction format in FIG. 6A that make up the augmentation operation field 550 according to one embodiment of the disclosure.

FIG. 7 is a block diagram of a register architecture according to one embodiment of the disclosure FIG. 8A is a block diagram illustrating both an exemplary in-order pipeline and an exemplary register renaming, out-of-order issue/execution pipeline according to embodiments of the disclosure.

FIG. 8B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
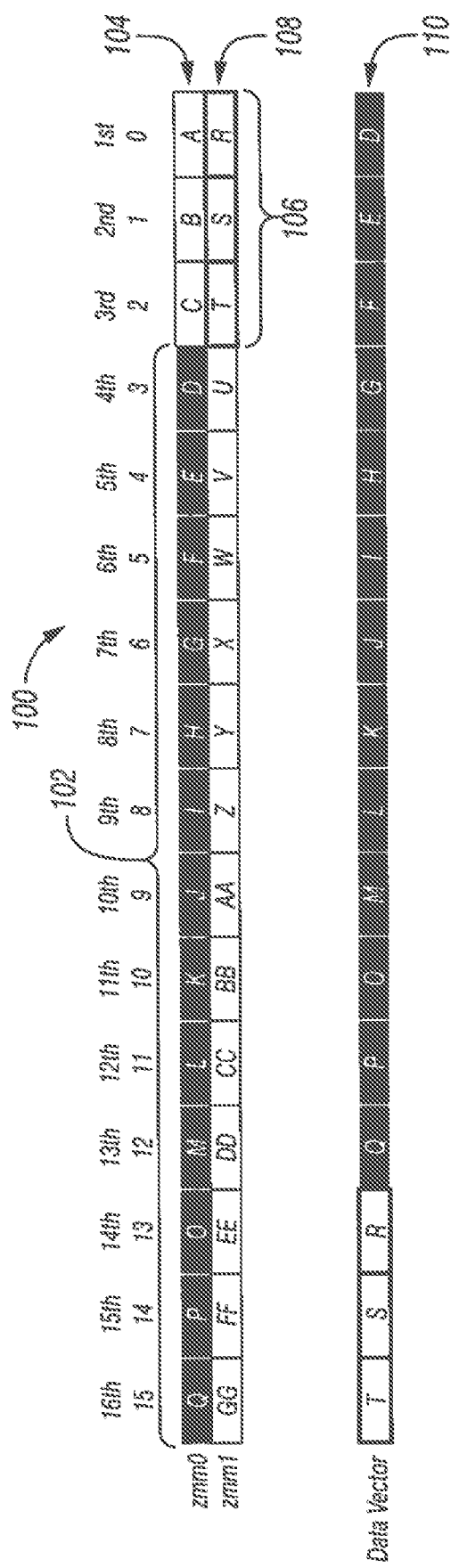
FIG. 1 illustrates a data vector formed from a first number of elements and a second number of elements of registers according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Instruction processing hardware (e.g., a hardware processor having one or more cores to decode and/or execute instructions) may operate on data, e.g., in performing arithmetic or logic functions. In one embodiment, the data is in vector form, e.g., having multiple elements that are managed as a unit for coherence purposes. In one embodiment, each element is a cache line. In one embodiment, a vector is a single instruction multiple data (SIMD) vector. An instruction may refer to a macro-instruction, e.g., an instruction that is provided to the processor for execution. Micro-instruction may refer to an instruction or set of instructions that results from a processor's decode unit decoding a macro-instruction. In one embodiment, a hardware processor operates (e.g., decodes and/or executes) on a SIMD vector(s). As discussed further below, embodiments of the disclosure are described in which the vector (e.g., a register storing the vector) has a five hundred and twelve (512) bit total length (e.g., size or width) with sixteen (16) elements that are each 32 (32) bits in length (e.g., size or width), however other lengths of vectors and/or elements may be utilized. As further non-limiting examples, a five hundred and twelve (512) bit vector (e.g., a register storing the vector) may have sixty-four (64) elements that are each eight (8) bits in length (e.g., size or width), thirty-two (32) elements that are each sixteen (16) bits in length (e.g., size or width), eight (8) elements that are each sixty-four (64) bits in length (e.g., size or width), or four (4) elements that are each one hundred and twenty-eight (128) bits in length (e.g., size or width). In certain embodiments a register (e.g., data storage device) to receive a vector has the same total number of bits as the vector, e.g., the same total number of bits in each addressable location. One example of an addressable location is a register, for example, a register that is addressable by a register operand (e.g., a register name).

A stencil computation (e.g., operation) is one example of a vector computation (e.g., operation) that may be commonly found in scientific computation, financial services, and seismic imaging, for example, as performed by a hardware processor. A stencil computation may have a general from of:

$$A[i] = \sum_{k=-L}^{L} A[i+k] \qquad (1)$$

where each node may have its own data (e.g., a weighted contribution from a subset of the adjacent nodes). However, a stencil computation performed on vector data, e.g., using a processor to operate on vector data (e.g., SIMD vectors and/or SIMD hardware), may require unaligned memory access(es). Unaligned may refer to (e.g., simultaneously) accessing elements from multiple registers, for example, logically adjacent registers. One embodiment to perform an unaligned memory access is to load two cache lines and to shift and merge the necessary data, e.g., over the course of multiple macro-instructions. One embodiment to perform an unaligned memory access is to shift and merge the aligned part of cache lines in registers. In certain embodiments, unaligned memory access may require two separate memory accesses per unaligned memory accesses, e.g., consuming processor (e.g., cache port) resources. The shift and merge solution may not be combinable with other vector instruction (e.g., instructions that are not vector align or shifting instructions) as a single macro-instruction, for example, consuming (e.g., issue slot and pipeline) more resources than a single macro-instruction. In certain embodiments, this disclosure provides architectural methods and apparatuses to allow unaligned memory access(es) be combined with (e.g., originally non-aligning) vector operations (e.g., into a single macro-instruction), for example, to improve performance and/or programmability. For instruction processing hardware (e.g., a hardware processor having one or more cores to decode and/or execute instructions), this disclosure may allow unaligned memory access(es) to be combined with other (e.g., originally non-aligning) vector operations, e.g., as a single macro-instruction.

In one embodiment, an instruction (e.g., macro-instruction) allows for the (e.g., direct) addressing of unaligned data in the register file (e.g., data that is in a plurality of registers) to be combined with other vector (e.g., SIMD) operations. For example, a register operand used in an instruction may be augmented with an offset (e.g., as part of the register operand or a separate field in the instruction). A pseudo-code (e.g., depicted in programming language and not machine language) example of a register operand with an elemental offset is provided below in Table 1.

TABLE 1

Example instruction format:

Opcode Destination Register, Source Register1:X, Source Register2:Y
Pseudo-code example:

VecOp Rdest, Rsrc1:X, Rsrc2:Y

Table 1 above illustrates an embodiment where a register operand (e.g., a register name) field in an instruction (e.g., macro-instruction) includes an elemental offset field. Elemental offset may generally refer to the number of elements of the register specified by the register operand to shift over before starting the access, e.g., to create a resulting data vector. Although two register operands (Source Register1 and Source Register2) with respective elemental offsets (X and Y) are illustrated, a single or any number of register operands may utilize an offset according to this disclosure. The names of Source Register1 and Source Register2 are used for convenience, e.g., they do not have to be consecutive numbers. Any register may be utilized, e.g., a source register or a destination register. A source register may also be a destination register, e.g., moving the results of the operation specified by the instruction's opcode into the source register. A single or any plurality of register operands (e.g., register names) may utilize an elemental offset in an instruction. Registers are not required to be logically sequential registers. In one embodiment, the elemental offset is a part of the register operand in an instruction, for example, if the register operand is zmm0 an additional number may be appended to (e.g., the beginning of) the register operand, e.g., 3zmm0 may refer to an access of register zmm0 and an elemental offset of 3. In another embodiment, the elemental offset is a separate field in the instruction (e.g., separated by a comma, colon or other character, such as, but not limited to, a non-numeric character). For example, zmm0, 3 may refer to an access of register zmm0 and an elemental offset of 3.

In one embodiment, an instruction (e.g., macro-instruction) with a register operand with an elemental offset allows the addressing (e.g., by the programmer) of the elements that start in one register and extend into the next (e.g., logical) register or registers.

Referring to the pseudo-code example in Table 1, the instruction opcode is generically recited as VecOp (e.g., a vector macro-instruction), the destination register operand (e.g., name) is Rdest, the first source register operand (e.g., name) is Rsrc1, and the second source register operand (e.g., name) is Rsrc2. In one embodiment, a vector operation is not only a memory alignment instruction. The first source register operand in the psuedo-code example in Table 1 includes an elemental offset that is shown as the variable X. The second source register operand in the psuedo-code example in Table 1 includes an elemental offset that is shown as the variable Y. The elemental offset (e.g., variable X or Y in this example) may be an immediate value (e.g., a number) or an address (e.g., a register or memory address) that contains the value or a pointer to the value.

In one embodiment, a user (e.g., processor and/or programmer) may address parts of two consecutive (e.g., logical) registers (e.g., a data vector formed therefrom) by using the register operand with an elemental offset such that the data vector may be operated on by that instruction. For example, an instruction utilizing a data field that is a register operand with an elemental offset may address the data vector formed from the elements specified by the register operand with an elemental offset, e.g., without requiring a separate aligning instruction (e.g., macro-instruction) be performed to generate the data vector.

FIG. 1 illustrates a data vector 110 formed from a first number of elements 102 of a first register 104 and a second number of elements 106 of a second register 108 according to embodiments of the disclosure. Using the exemplary instruction format in Table 1 above, an instruction (e.g., a register access format thereof) may have the form of VecOp Rdest, Rsrc1, zmm0:3. In this example, VecOp is an opcode for an instruction (e.g., macro-instruction) to operate on the source data. In one embodiment, a vector instruction may be an instruction (e.g., macro-instruction) that is not merely a memory alignment instruction, such as, but not limited to, a vector align instruction or a shifting instruction. A register operand without an elemental offset (e.g., zmm0 as an example) may be replaced with a register operand with an elemental offset (e.g., zmm0:3 in this example). An instruction may indicate (e.g., via the hardware in the processor) the total number of bits and/or elements in a register and/or a size of each element in the register. As discussed below, a register operand may indicate (e.g., via the hardware in the processor) the size of the register specified by the register operand. For example, the zmm registers (e.g., zmm0 to zmm31) may be 512 bit (e.g., SIMD) registers. In the embodiment in FIG. 1, zmm0 and zmm1 (the next logical register here) include sixteen total elements that may each be thirty-two (32) bits in size.

Registers zmm0 and zmm1 are depicted with the element position numbers 0-15 (e.g., the $1^{st}$ element position being 0 and the $16^{th}$ element position being 15) increasing from right to left, although other position numbering schemes may be utilized, e.g., increasing from left to right. In the example in FIG. 1, a vector instruction may include a register operand (zmm0) with an elemental offset (3) that is zmm0:3 in the format of Table 1. In one embodiment, an instruction's (e.g., macro-instruction's) vector operation is to be performed on the data vector formed from the elements that are specified by the register operand with the elemental offset. In the embodiment in FIG. 1, zmm0:3 may cause (e.g., via a hardware processor) a decode unit (e.g., decoder or decoder unit) (see, e.g., decode unit 840 and decode unit 900 discussed below) to decode a vector instruction with a register operand (e.g., zmm0 in FIG. 1) with an elemental offset (e.g., 3 in FIG. 1) to form a data vector (e.g., data vector 110 in FIG. 1) therefrom. Although the letters A-GG are used to illustrate the data (e.g., payload) in each element in registers zmm0-zmm1, the data therein may be any data.

In one embodiment, an elemental offset indicates the element position (e.g., as opposed to the element number which would be in the range of $16^{th}$-$1^{st}$ in FIG. 1) the data vector is to start at, for example, an elemental offset of 3 for zmm0 may refer to beginning the data vector at the element position 3 (the $4^{th}$ element) as shown in FIG. 1, e.g., the elemental offset may be the number of elements to shift over before starting the data vector. In another embodiment, an input into an elemental offset field indicates the element number (e.g., as opposed to the element position which would be in the range of 15-0 in FIG. 1) the data vector is to start at, for example, an elemental offset field input of 4 for zmm0 may refer to beginning the data vector at the $4^{th}$ element (element position 3) as shown in FIG. 1. Methods and apparatuses herein may convert an inputted element number in the elemental offset field to the element position to form an elemental offset, for example, an elemental offset field input of 4 for zmm0 may refer to beginning the data vector at the $4^{th}$ element (element position 3) and thus using the element position (e.g., 3 in this example) as the elemental offset. In one embodiment, an elemental offset of zero (e.g., representing the element position) indicates no elemental offset. For example, zmm0:0 or zmm1:0 includes an elemental offset of zero such that there is no elemental offset, that is, zmm0:0 is functionally equivalent to zmm0 and zmm1:0 is functionally equivalent to zmm1.

Forming the data vector may include (e.g., via the decode unit as opposed to the execution unit that is to execute a macro-instruction with a register operand with an elemental offset) (e.g., the decode unit may cause some or all of the following) accessing a first number of elements (e.g., the 13 elements indicated with the reference number 102 from zmm0 in FIG. 1) in a register specified by the register operand (e.g., zmm0 in FIG. 1), wherein the first number is a total number of elements in the register (e.g., 16 in FIG. 1) minus the elemental offset (e.g., 3 in FIG. 1), accessing a second number of elements (e.g., the 3 elements indicated with the reference number 106 from zmm1 in FIG. 1) in a next logical register (e.g., zmm1 in FIG. 1), wherein the second number is the elemental offset (e.g., 3 in FIG. 1), and combining the first number of elements and the second number of elements as a data vector 110. In one embodiment, the second number of elements is less than the total number of elements in the next logical register and/or greater than zero.

Completed data vector 110 may then be operated on by an execution unit, e.g., without requiring the data vector to be formed (e.g., combined) in a separate macro-instruction. For example, a decode unit may output (or cause the output of) the data vector to the execution unit without outputting the data vector back into the decode unit, e.g., output the data vector directly to an execution unit or a reorder buffer (ROB) or a queue thereof). A decode unit may include or utilize a register and/or memory access hardware unit. Decode unit may include data fetch logic and/or hardware circuitry.

Depicted data vector 110 includes the specified elements from register zmm0 (element positions 15-3 which are shown with the payload of Q-D and are the $16^{th}$ through the $4^{th}$ elements and indicated with the reference number 102) combined (e.g., abutted) with the specified elements from register zmm1 (element positions 2-0 which are shown with the payload of T-R and are the $3^{rd}$ through the $1^{st}$ elements and indicated with the reference number 106). Depicted elements are retained in the same order as they are in their original registers but not the same element positions. Depicted elements of data vector 110 from the register specified by the register operand with the elemental offset in the instruction (element positions 15-3 which are shown with the payload of Q-D and are the $16^{th}$ through the $4^{th}$ elements and indicated with the reference number 102) begin from the right-most position in data vector 110 with the specified elements from register zmm1 (element positions 2-0 which are shown with the payload of T-R and are the 3$^{rd}$ through the 1$^{st}$ elements and indicated with the reference number 106) beginning in the left-most position in data vector. In one embodiment, the left-most element of the elements specified by the register operand with the elemental offset in the instruction (e.g., element position 15 in FIG. 1 which is shown with the payload of Q and is the 16$^{th}$ element) abuts (e.g., is adjacent to) the right-most element of the elements from the next logical register (e.g., element position 2 in FIG. 1 which is shown with the payload of R and is the 1$^{st}$ element) to form the data vector 110. In one embodiment, the right-most element of the elements specified by the register operand with the elemental offset in the instruction abuts the left-most element of the elements from the next logical register to form a data vector.

A hardware processor (e.g., see below for examples of processors) may include circuitry to form a data vector according to this disclosure. A hardware circuit and/or logic of a processor may form a data vector according to this disclosure.

Although the embodiment depicted in FIG. 1 includes the elemental offset starting from the right-most element of the register specified by the register operand with an elemental offset, an elemental offset may start from a left-most element. Although the embodiment depicted in FIG. 1 includes the elements of the data vector from the next logical register beginning at the right-most element, they may start from a left-most element. A register and its next logical register may be numbered sequentially. A next logical register may not be numbered sequentially, for example, register zmm0 may be the next logical register to zmm31, e.g., if there are registers zmm0-zmm31. In one embodiment, a next logical register (e.g., its operand) may be determined (e.g., via decode unit) from an instruction including the operand of the previous logical register, for example, not from a data field in the instruction including the next logical register's operand. In one embodiment, a register is a data register, e.g., as opposed to an instruction register. In one embodiment, a register specified by a register operand with an elemental offset is a vector register, for example, a register containing a plurality of data (e.g., discrete elements and each element may include a plurality of bits). In one embodiment, a register specified by a register operand with an elemental offset is a single instruction multiple data (SIMD) register.

Methods and apparatuses of this disclosure may include hardware circuitry to detect (e.g., in a macro-instruction) a register operand (e.g., a register to be accessed for the contents therein) and an elemental offset (e.g., field) to form a data vector using elements in the register specified by the register operand and elements from the next logical register. In one embodiment, the information to create the data vector is encoded in the instruction itself (e.g., in a data field of the instruction, such as, but not limited to, the register operand). For example, an instruction may include a vector length field (e.g., vector length field 559B discussed below) or may not include a vector length field. A hardware processor (e.g., a decode unit thereof) may determine the total number of elements in register(s) and/or in a data vector and/or determine a size of each element in register(s) and/or in a data vector from the instruction. In one embodiment, the instruction includes information for the hardware to determine how many bits correspond to an elemental offset, e.g., the instruction includes information for the hardware processor (e.g., a decode unit) to determine what element of the register specified by the register operand with an elemental offset to begin the data vector and/or what element of the next logical register is the end of the data vector. In one embodiment, the instruction includes information for the hardware processor (e.g., a decode unit) to determine how to combine the elements from different registers into a data vector, e.g., which elements for the registers are to abut in the data vector. In one embodiment, the instruction includes information for the hardware processor (e.g., a decode unit) to determine from which end of the register the elemental offset is begun. In one embodiment, the instruction includes information for the hardware processor (e.g., a decode unit) to determine the next logical register, e.g., from the register operand of the logical register used in the instruction. In one embodiment, an instruction may support (e.g., utilize) a data field that includes a first register operand, a second register operand, and an elemental offset to form a data vector that may be operated on by the instruction. For example, a data vector formed (e.g., by the decode unit) by combining a first and a second number of elements, wherein the first number of elements are from a first register specified by the first register operand and the first number is the total number of elements in the register minus the elemental offset and wherein the second number of elements are from a second register specified by the second register operand and the second number is the elemental offset, e.g., without requiring a separate aligning instruction (e.g., macro-instruction) be performed to generate the data vector. One form of such an instruction may include an opcode for the vector instruction, a destination register operand, and two source register operands. Either or both of the source register operands may be in the form of the first register operand, second register operand, and elemental offset (e.g., in any order of those three components). In an example where both operands are in that form, a vector instruction may have 6 operand fields in the source fields, e.g., three from {RegisterSource1, RegisterSource2: ElementalOffsetA} and three from {RegisterSource3, RegisterSource4: ElementalOffsetB}. Although the elemental offsets are shown as following RegisterSource2 and RegisterSource3, an elemental offset may follow RegisterSource1 and/or RegisterSource3. In one embodiment, a register operand includes information for the hardware processor (e.g., a decode unit) to determine the total size of the register specified by the register operand, the total number of elements of the register specified by the register operand (and/or the next logical register), and/or the size of each element of the multiple elements in the register specified by the register operand. In one embodiment, each element of multiple elements in a register and/or data vector is the same size. In one embodiment, the register, the next logical register, the data vector, or any combination thereof have a same total number of elements, a same size of each element, and/or a same total size.

Certain embodiments of this disclosure provides element aligned register accesses (e.g., to a SIMD register) and not SIMD width aligned accesses. Certain embodiments of this disclosure allow for stencil or other unaligned memory operations to map directly on to the hardware, for example, to provide an efficient computation engine by a hardware processor for stencil computation and other computations that include unaligned memory access(es).

The text below describes three non-limiting examples of implementations of certain embodiments of this disclosure.

Certain embodiments of this disclosure may be implemented by utilizing two or more micro-operations (e.g., micro-ops) generated by a hardware processor decoding a macro-instruction that includes a register operand having an elemental offset field. For example, one micro-operation may form a data vector and a second micro-operation may perform the operation specified in the instruction on at least the data vector. A psuedo-code example is in Table 2 below.

TABLE 2

Example micro-ops:

VecAlign Rtmp, Rsrc2, Rsrc2+1, Y
VecOp Rdest, Rsrc1, Rtmp

Table 2 above illustrates a macro-instruction that is formed from a vector align (VecAlign) micro-operation and a (e.g., non-aligning) vector micro-operation (VecOp), e.g., a vector operation that does not support utilizing an elemental offset. Referring again to the example of an (e.g., macro-) instruction (e.g., a register access format thereof) having the form of VecOp Rdest, Rsrc1, zmm0:3, a sequence of micro-ops may implement this instruction by having a first micro-op that forms the data vector (e.g., VecAlign) and a second micro-op that preforms the vector operation (e.g., VecOp) on the data vector. For example, if Rsrc2:Y in such an instruction is zmm0:3 (with Rscrc2 being zmm0 and Y being the number 3), the first micro-op may form the data vector (e.g., where Rsrc2+1 is zmm1), for example, the data vector 110 in FIG. 1 and store it in a register (e.g., temporary register with register operand Rtmp). Then that data vector (e.g., data vector 110 in FIG. 1) stored in Rtmp may be operated on in the vector operation (e.g., VecOp).

In certain embodiments, a plurality of micro-operations (for example, that include at least one (e.g., merely) memory alignment micro-instruction, such as, but not limited to, a vector align or shifting micro-instruction) may not be utilized. Certain embodiments of this disclosure may be implemented by utilizing a single operation (e.g., a single macro-operation that includes only a single micro-operation and/or no memory alignment micro-instruction) to combine the forming of a data vector as disclosed herein with a vector instruction (e.g., a vector instruction that is not solely a memory alignment instruction, such as, but not limited to, a vector align instruction or a shifting type of instruction). A decode unit may create (or cause the creation of) a data vector according to this disclosure, e.g., without requiring use of an execution unit (e.g., a shifter in an execution unit). For example, a hardware processor (e.g., a decode unit thereof) may include a circuit (e.g., that is not part of the execution unit) for forming a data vector when an instruction includes a register operand having an elemental offset (e.g., an elemental offset circuit and/or logic).

Figure 2:
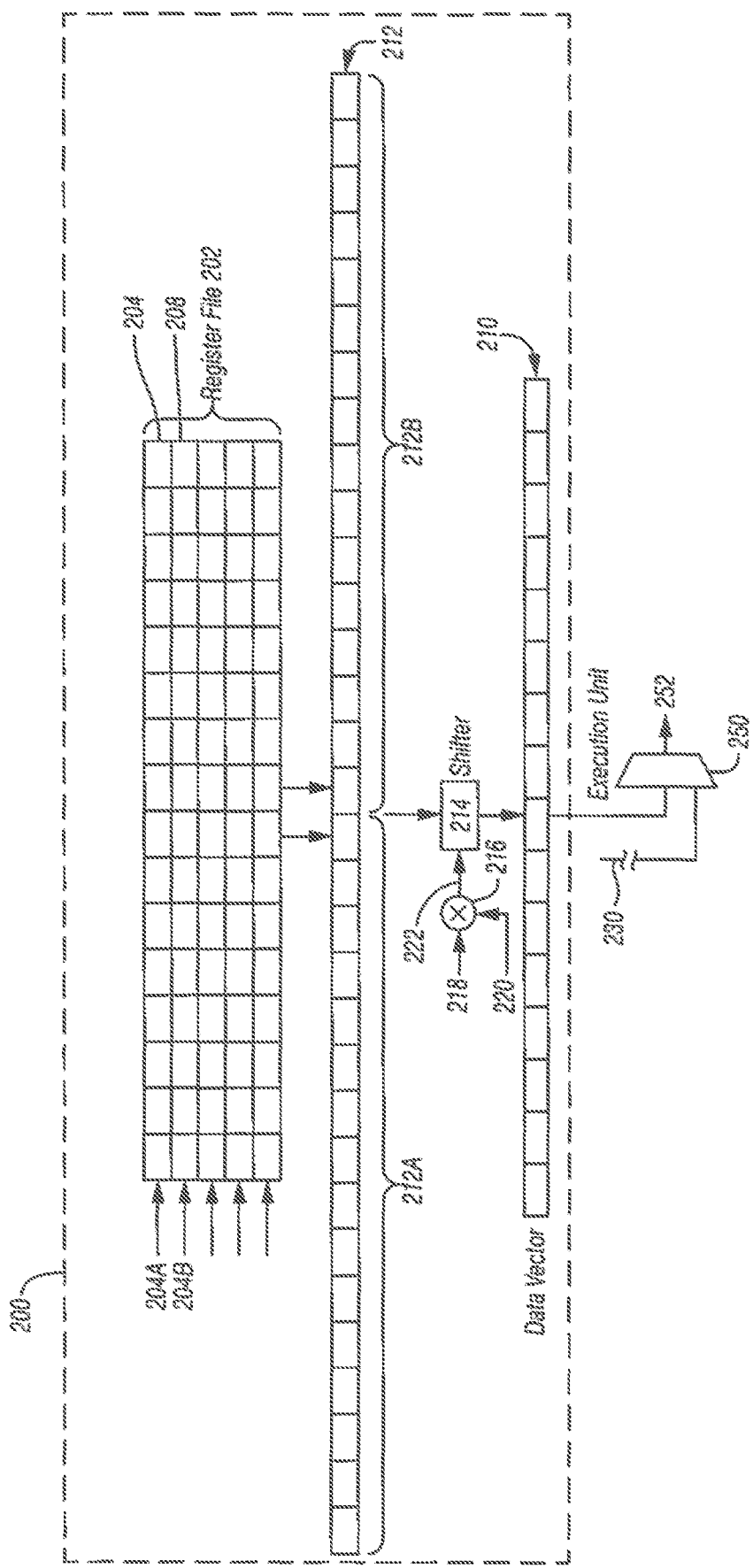
FIG. 2 illustrates a hardware circuit including a shifter to form a data vector according to embodiments of the disclosure.

FIG. 2 illustrates a hardware circuit 200 including a shifter (or a register rotator) to form a data vector according to embodiments of the disclosure. Hardware circuit may be part of a processor. Depicted circuit 200 includes a multi-ported register file 202 including a register 204 (e.g., zmm0 using the example in FIG. 1) having a plurality of elements (e.g., 16 elements here, which may be 32 bits for each element). Register 204 may be specified by a register operand (e.g., zmm0) having an elemental offset (e.g., 3 using the example in FIG. 1) from a vector instruction (e.g., a vector instruction that is not solely a memory alignment instruction, such as, but not limited to, a vector align instruction or a shifting type of instruction).

Circuit 200 (e.g., in response to a vector instruction with a register operand with an elemental offset being decoded) may receive control signals (e.g., from logic) to load (e.g., all of) the elements of register 204 (e.g., zmm0 using the example of FIG. 1) and (e.g., all of) the elements of next logical register 208 (e.g., zmm1 using the example of FIG. 1). Control signals (e.g., 204A,208A, etc.) may enable register file 202 to load (e.g., copy) the contents of any register into a portion of register (e.g., concatenating register) 212. In one embodiment, concatenating register 212 is at least the same size as the total number of bits in the register specified by the register operand with an elemental offset and the next logical register. Shifter 214 may then shift the concatenated vector by the elemental offset (e.g., 3 using the example in FIG. 1) to form the data vector. Shifter 214 may be its own component or part of concatenating register 212. Shifter may take the elemental offset as an input. A hardware processor (e.g., decode unit thereof) may include logic (e.g., elemental offset logic) to control circuit 200 to form data vector 210.

Turing again to the example in FIG. 1, multiplier 216 in FIG. 2 may take as input the elemental offset (e.g., the number of elements to shift) into input 218 and take as input the size of each element (for example, the number of bits of each element, which may be known by the circuitry as discussed herein, e.g., from the instruction or the register operand thereof) into the other input 220 to the multiplier 216. For example, with an elemental offset of 3 inputted into multiplier input 218 and a size of each element of 32-bits, the multiplier 216 may provide (e.g., as output) the result of a 96 bit shift to the shifter 214 at its input 222. In one embodiment, circuit 200, e.g., excluding execution unit 250, is part of the decode unit. Using the example in FIG. 1, a concatenated vector may include the contents of register 204 (e.g., zmm0) in the right portion 212B of concatenated register 212 and the contents of (e.g., next logical) register 208 (e.g., zmm1) in the left portion 212A of concatenated register 212 and that concatenated data be shifted by the elemental offset (e.g., a shift of the contents to the right here of three elements). Shift register (or concatenated register if so used) may then output the data vector 210, e.g., to the execution unit 250 of the hardware processor or to a reorder buffer (ROB) if utilized.

In one embodiment, concatenated register 212 (or shift register if so used) outputs the shifted, concatenated vector to a masking register (not shown), where the desired total size of the data vector (e.g., the same size as register 204) is output, e.g., to the execution unit 250. Execution unit 250 may take other inputs (shown as one input 230 in FIG. 2, for example, from other registers in register file 202) along with the input of data vector 210 to perform the vector operation indicated by the instruction that included the register operand with an elemental offset that was decoded and then output the result 252. In an embodiment where circuitry 200 (except for the execution unit 250) is not part of the execution unit (e.g., execution engine unit), the data vector may be formed without utilizing the execution unit, for example, such that the data vector does not have to travel through the processor pipeline and/or consume (e.g., issue slot, pipeline, register alias table [RAT], and/or physical registers, for example, not consuming the registers in register file 202 as circuit 200 may include its own register(s)) resources. In one embodiment, the data vector is formed during the decoding phase of a hardware processor processing an instruction (e.g., macro-instruction), for example, not during the execution phase.

Figure 3:
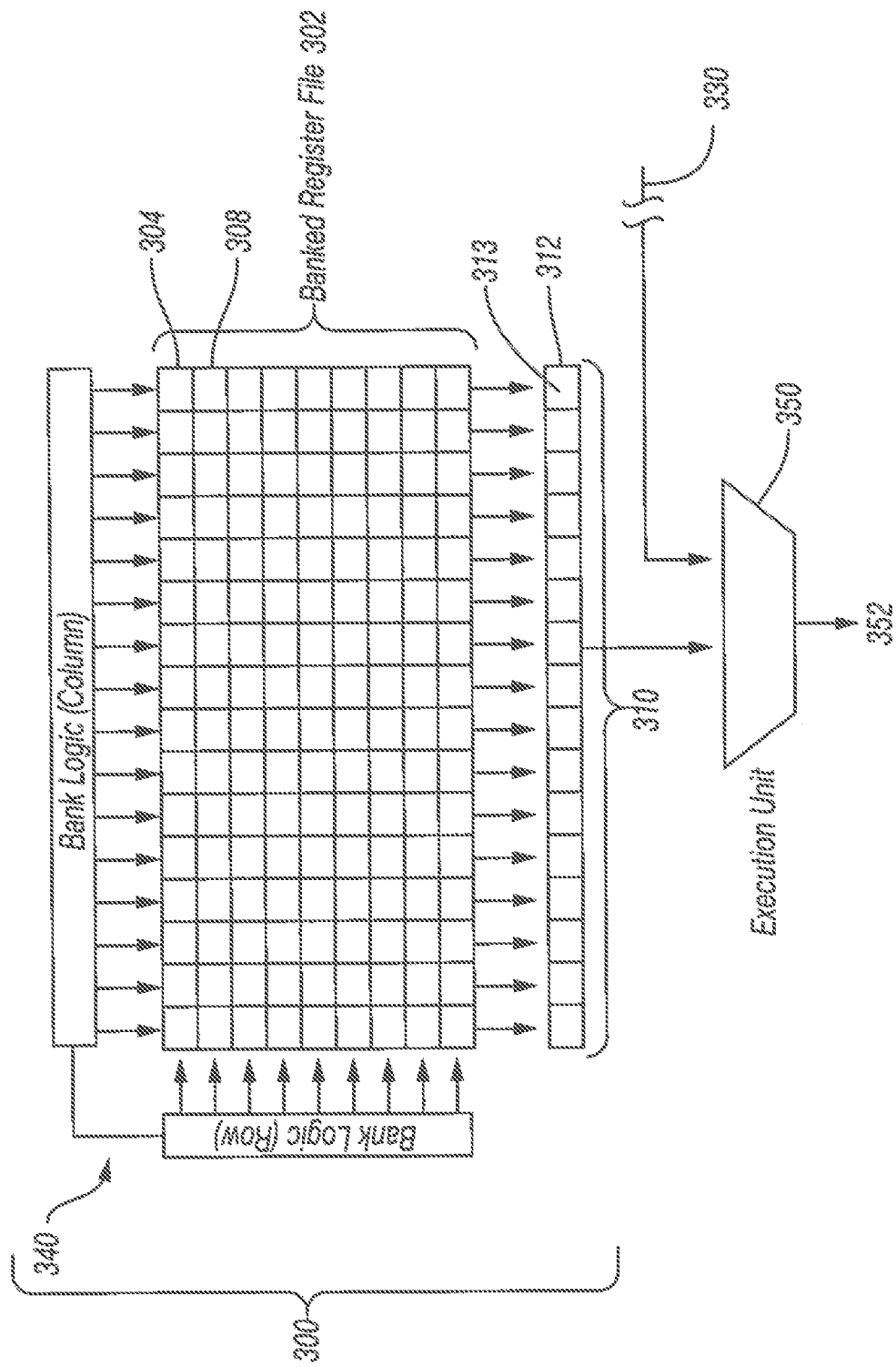
FIG. 3 illustrates a hardware circuit including a banked register file to form a data vector according to embodiments of the disclosure.

FIG. 3 illustrates a hardware circuit 300 including a multiported banked register file 302 to form a data vector 310 according to embodiments of the disclosure. Although sixteen banks per row of the banked register file 302 are illustrated, any number of banks (e.g., a plurality of banks per row) may be utilized. In one embodiment, a row is at least as large as a register and that row has at least one bank for each element in that register. Banked register file 302 includes bank logic 340, which may include column and row logic as shown. Bank logic 340 may be part of a hardware processor (e.g., a decode unit thereof). Hardware processor (e.g., a decode unit thereof) that includes circuit 300 may send a control signal(s) to the bank logic 340 that allows a data vector to be output directly into data vector register 312 (or directly to (e.g., a register of) execution unit 350) from the banked register file 302. In one embodiment, a hardware processor (e.g., a decode unit thereof) that includes circuit 300 detects a vector instruction with a register operand with an elemental offset and generates signal(s) to be sent to the banked register file 302 to select certain banks of the banked register file 302 to combine as data vector 310. Hardware processor may include logic (e.g., elemental offset logic) to detect a vector instruction with a register operand with an elemental offset, determine which elements from the register specified by the register operand and which elements from the next (e.g., logical) register are to form the data vector (e.g., data vector 110 in FIG. 1 or data vector 310 in FIG. 3) and send a signal to the bank logic to cause the bank logic to select the banks to form the data vector 310 (e.g., in data vector register 312). Using the example in FIG. 1, if row 304 of banked register file 302 is (or includes the contents of) register zmm0 and row 308 is (or includes the contents of) register zmm1, and logic (e.g., elemental offset logic) detects that register operand zmm0 in a vector instruction includes an elemental offset of 3 (e.g., zmm0:3), logic may determine that the first number of elements 102 shown in first register 104 and a second number of elements 106 of a second register 108 in FIG. 1 are to form the data vector, determine what position of the data vector 310 (e.g., data vector register 312) they are to be placed, and inform the bank logic 340 to select those banks and output the data therein into the data vector (e.g., data vector register 312). For example, a select signal (e.g., in the form of source row and column and/or destination column) may be generated for each bank. A select source signal to select a source bank in FIG. 3 may include selecting one of the sixteen column selection lines shown as arrows extending from the Bank Logic (column) module and selecting one of the nine row selection lines shown as arrows extending from the Bank Logic (row) module. A select destination signal to select a destination for the selected bank may include selecting one of the sixteen positions of the data vector 310 (e.g., data vector register 312) shown as arrows extending from the banked register file 302.

The following example assumes that a row of the banked register file is the same size as a row of the register specified by the operand (e.g., that banked register row 304 is the same size as register 104 in FIG. 1 and that banked register row 308 is the same size as register 108 in FIG. 1) and that the size and number of elements are the same (e.g., that the banks in register row 304 are the same size and number as the elements in register 104 and that banks in register row 308 are the same size and number as the elements in register 108), but the disclosure is not so limited. In this example, logic (e.g., elemental offset logic) may determine that the $4^{th}$ element (containing the payload of data "D") of register 304 is to be the first element 313 (e.g., from the right) in data vector 310 (e.g., in data vector register 312) and send a select signal (or have bank logic 340 determine the select signal from an output of the logic) to cause data "D" to be moved into first element 313 in data vector 310 and similarly to populate the other elements of data vector 310. Competed data vector 310 (e.g., the size and the same number of elements as the register specified by the register operand with the elemental offset) may then be output, e.g., to the execution unit 350. Execution unit 350 may take other inputs (shown as one input 330 in FIG. 3, for example, from other registers in banked register file 302 or a non-banked register file) along with the input of data vector 310 to perform the vector operation indicated by the instruction that included the register operand with an elemental offset that was decoded and then output the result 352. In an embodiment where circuitry 300 (except for the execution unit 350) is not part of the execution unit (e.g., execution engine unit), the data vector may be formed without utilizing the execution unit, for example, such that the data vector does not have to travel through the processor pipeline and/or consume (e.g., issue slot, pipeline, register alias table [RAT], and/or physical registers, for example, not consuming the registers in banked register file 302 as circuit 300 may include its own register(s)) resources. In one embodiment, the data vector is formed during the decoding phase of a hardware processor processing an instruction (e.g., macro-instruction), for example, not during the execution phase.

In one embodiment, bank logic may have individual banks that are each smaller than the size of each element of a register specified by a register operand with an elemental offset. Although arrows are shown extending in a straight line from a column of banked register file 302 to data vector 310 (e.g., data vector register 312), bank logic 340 can output any bank in banked register file 302 to any bank (e.g., element) of data vector register 312. In one embodiment, elemental offset logic is part of the decode unit. In one embodiment, bank logic 340 is part of the elemental offset logic.

In one embodiment, bank logic may have individual banks that are the same size as the smallest possible element size that the the vector instruction supports. For example, in one embodiment an 8 bit element may be the smallest element size that a vector instruction supports, thus a 512 bit vector may have 64 banks that are 8 bits in size (e.g., 64 banks in one row of the banked register file).

Figure 4:
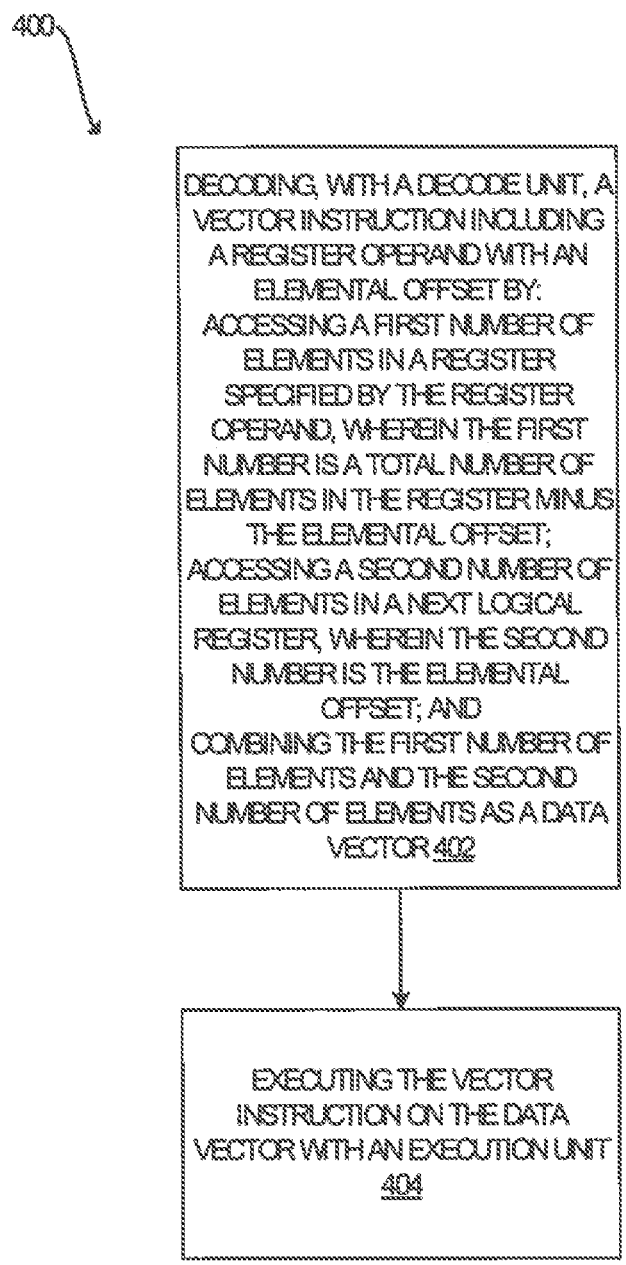
FIG. 4 illustrates a flow diagram of creating a data vector according to embodiments of the disclosure.

FIG. 4 illustrates a flow diagram 400 of creating a data vector according to embodiments of the disclosure. Flow diagram 400 includes decoding, with a decode unit, a vector instruction with a register operand with an elemental offset to: access a first number of elements in a register specified by the register operand, wherein the first number is a total number of elements in the register minus the elemental offset, access a second number of elements in a next logical register, wherein the second number is the elemental offset, and combine the first number of elements and the second number of elements as a data vector 402, and executing the vector instruction on the data vector with an execution unit 404.

In one embodiment, a hardware processor includes a decode unit to decode a vector instruction with a register operand with an elemental offset to: access a first number of elements in a register specified by the register operand, wherein the first number is a total number of elements in the register minus the elemental offset, access a second number of elements in a next register, wherein the second number is the elemental offset, and combine the first number of elements and the second number of elements as a data vector, and an execution unit to execute the vector instruction on the data vector.

In another embodiment, a hardware processor includes a decode unit to decode a vector instruction with a register operand with an elemental offset and logic to access a first number of elements in a register specified by the register operand, wherein the first number is a total number of elements in the register minus the elemental offset, access a second number of elements in a next register, wherein the second number is the elemental offset, and combine the first number of elements and the second number of elements as a data vector.

A vector instruction may indicate the total number of elements in the register and a size of each element in the register. The next register may be a next logical register from the register specified by the register operand. The next register may be specified by a second register operand of the vector instruction. The register, the next register, and the data vector may have a same total number of elements and a same size of each element. A hardware processor may include a circuit and/or logic to concatenate the elements in the register and the elements in the next register to form a concatenated vector, and shift the concatenated vector by the elemental offset to form the data vector. The circuit may include a multiplier to multiply the elemental offset by a size of each element in the register to determine a number of bits to shift the concatenated vector to form the data vector. A hardware processor may include a banked register file that includes the elements in the register and the elements in the next register, and a circuit and/or bank logic to combine the first number of elements and the second number of elements from the banked register file as the data vector. Each bank of the banked register file may be a same size as the elements in the register and the elements in the next register. A decode unit may output the data vector to the execution unit without an output of the data vector back into the decode unit.

In yet another embodiment, a method includes decoding, with a decode unit, a vector instruction with a register operand with an elemental offset to: access a first number of elements in a register specified by the register operand, wherein the first number is a total number of elements in the register minus the elemental offset, access a second number of elements in a next register, wherein the second number is the elemental offset, and combine the first number of elements and the second number of elements as a data vector, and executing the vector instruction on the data vector with an execution unit. The method may include determining the total number of elements in the register and a size of each element in the register from the vector instruction. The next register may be a next logical register from the register specified by the register operand. The next register may be specified by a second register operand of the vector instruction. The register, the next register, and the data vector may have a same total number of elements and a same size of each element. The method may include concatenating the elements in the register and the elements in the next register to form a concatenated vector, and shifting the concatenated vector by the elemental offset to form the data vector. The shifting may include multiplying the elemental offset by a size of each element in the register to determine a number of bits to shift the concatenated vector to form the data vector. The method may include providing a banked register file that includes the elements in the register and the elements in the next register, and combining the first number of elements and the second number of elements from the banked register file as the data vector. Each bank of the banked register file may be a same size as the elements in the register and the elements in the next register. The method may include outputting the data vector to the execution unit from the decode unit without outputting the data vector back into the decode unit.

In yet another embodiment, an apparatus includes a set of one or more processors, and a set of one or more data storage devices that stores code, that when executed by the set of processors causes the set of one or more processors to perform the following: decoding, with a decode unit, a vector instruction with a register operand with an elemental offset to: access a first number of elements in a register specified by the register operand, wherein the first number is a total number of elements in the register minus the elemental offset, access a second number of elements in a next register, wherein the second number is the elemental offset, and combine the first number of elements and the second number of elements as a data vector, and executing the vector instruction on the data vector with an execution unit. The set of data storage devices may further store code, that when executed by the set of processors causes the set of processors to perform the following: determining the total number of elements in the register and a size of each element in the register from the vector instruction. The next register may be a next logical register from the register specified by the register operand. The next register may be specified by a second register operand of the vector instruction. The register, the next register, and the data vector may have a same total number of elements and a same size of each element. The set of data storage devices may further store code, that when executed by the set of processors causes the set of processors to perform the following: concatenating the elements in the register and the elements in the next register to form a concatenated vector, and shifting the concatenated vector by the elemental offset to form the data vector. The set of data storage devices may further store code, that when executed by the set of processors causes the set of processors to perform the following: wherein the shifting comprises multiplying the elemental offset by a size of each element in the register to determine a number of bits to shift the concatenated vector to form the data vector. The set of data storage devices may further store code, that when executed by the set of processors causes the set of processors to perform the following: providing a banked register file that includes the elements in the register and the elements in the next register, and combining the first number of elements and the second number of elements from the banked register file as the data vector. Each bank of the banked register file may be a same size as the elements in the register and the elements in the next register. The set of data storage devices may further store code, that when executed by the set of processors causes the set of processors to perform the following: further comprising outputting the data vector to the execution unit from the decode unit without outputting the data vector back into the decode unit.

In another embodiment, a hardware processor includes means to decode a vector instruction with a register operand with an elemental offset to: access a first number of elements in a register specified by the register operand, wherein the first number is a total number of elements in the register minus the elemental offset, access a second number of elements in a next register, wherein the second number is the elemental offset, and combine the first number of elements and the second number of elements as a data vector, and/or means to execute the vector instruction on the data vector.

In yet another embodiment, a machine readable storage medium includes code, that when executed causes a machine to perform a method disclosed herein.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

FIGS. 5A-5B are block diagrams illustrating a generic vector friendly instruction format and instruction templates thereof according to embodiments of the disclosure. FIG. 5A is a block diagram illustrating a generic vector friendly instruction format and class A instruction templates thereof according to embodiments of the disclosure; while FIG. 5B is a block diagram illustrating the generic vector friendly instruction format and class B instruction templates thereof according to embodiments of the disclosure. Specifically, a generic vector friendly instruction format 500 for which are defined class A and class B instruction templates, both of which include no memory access 505 instruction templates and memory access 520 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operands and sizes (e.g., 256 byte vector operands) with more, less, or different data element widths (e.g., 128 bit (16 byte) data element widths).

The class A instruction templates in FIG. 5A include: 1) within the no memory access 505 instruction templates there is shown a no memory access, full round control type operation 510 instruction template and a no memory access, data transform type operation 515 instruction template; and 2) within the memory access 520 instruction templates there is shown a memory access, temporal 525 instruction template and a memory access, non-temporal 530 instruction template. The class B instruction templates in FIG. 5B include: 1) within the no memory access 505 instruction templates there is shown a no memory access, write mask control, partial round control type operation 512 instruction template and a no memory access, write mask control, vsize type operation 517 instruction template; and 2) within the memory access 520 instruction templates there is shown a memory access, write mask control 527 instruction template.

The generic vector friendly instruction format 500 includes the following fields listed below in the order illustrated in FIGS. 5A-5B.

Format field 540—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 542—its content distinguishes different base operations.

Register index field 544—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 546—its content distinguishes occurrences of instructions in the generic vector instruction format that specify memory access from those that do not; that is, between no memory access 505 instruction templates and memory access 520 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 550—its content distinguishes which one of a variety of different operations to be performed in addition to the base operation. This field is context specific. In one embodiment of the disclosure, this field is divided into a class field 568, an alpha field 552, and a beta field 554. The augmentation operation field 550 allows common groups of operations to be performed in a single instruction rather than 2, 3, or 4 instructions.

Scale field 560—its content allows for the scaling of the index field's content for memory address generation (e.g., for address generation that uses $2^{scale}*\text{index}+\text{base}$).

Displacement Field 562A—its content is used as part of memory address generation (e.g., for address generation that uses $2^{scale}*\text{index}+\text{base}+\text{displacement}$).

Displacement Factor Field 562B (note that the juxtaposition of displacement field 562A directly over displacement factor field 562B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 574 (described later herein) and the data manipulation field 554C. The displacement field 562A and the displacement factor field 562B are optional in the sense that they are not used for the no memory access 505 instruction templates and/or different embodiments may implement only one or none of the two.

Data element width field 564—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 570—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 570 allows for partial vector operations, including loads, stores, arithmetic, logical, etc. While embodiments of the disclosure are described in which the write mask field's 570 content selects one of a number of write mask registers that contains the write mask to be used (and thus the write mask field's 570 content indirectly identifies that masking to be performed), alternative embodiments instead or additional allow the mask write field's 570 content to directly specify the masking to be performed.

Immediate field 572—its content allows for the specification of an immediate. This field is optional in the sense that is it not present in an implementation of the generic vector friendly format that does not support immediate and it is not present in instructions that do not use an immediate.

Class field 568—its content distinguishes between different classes of instructions. With reference to FIGS. 5A-B, the contents of this field select between class A and class B instructions. In FIGS. 5A-B, rounded corner squares are used to indicate a specific value is present in a field (e.g., class A 568A and class B 568B for the class field 568 respectively in FIGS. 5A-B).

Instruction Templates of Class A

In the case of the non-memory access 505 instruction templates of class A, the alpha field 552 is interpreted as an RS field 552A, whose content distinguishes which one of the different augmentation operation types are to be performed (e.g., round 552A.1 and data transform 552A.2 are respectively specified for the no memory access, round type operation 510 and the no memory access, data transform type operation 515 instruction templates), while the beta field 554 distinguishes which of the operations of the specified type is to be performed. In the no memory access 505 instruction templates, the scale field 560, the displacement field 562A, and the displacement scale filed 562B are not present.

No-Memory Access Instruction Templates—Full Round Control Type Operation

In the no memory access full round control type operation 510 instruction template, the beta field 554 is interpreted as a round control field 554A, whose content(s) provide static rounding. While in the described embodiments of the disclosure the round control field 554A includes a suppress all floating point exceptions (SAE) field 556 and a round operation control field 558, alternative embodiments may support may encode both these concepts into the same field or only have one or the other of these concepts/fields (e.g., may have only the round operation control field 558).

SAE field 556—its content distinguishes whether or not to disable the exception event reporting; when the SAE field's 556 content indicates suppression is enabled, a given instruction does not report any kind of floating-point exception flag and does not raise any floating point exception handler.

Round operation control field 558—its content distinguishes which one of a group of rounding operations to perform (e.g., Round-up, Round-down, Round-towards-zero and Round-to-nearest). Thus, the round operation control field 558 allows for the changing of the rounding mode on a per instruction basis. In one embodiment of the disclosure where a processor includes a control register for specifying rounding modes, the round operation control field's 550 content overrides that register value.

No Memory Access Instruction Templates—Data Transform Type Operation

In the no memory access data transform type operation 515 instruction template, the beta field 554 is interpreted as a data transform field 554B, whose content distinguishes which one of a number of data transforms is to be performed (e.g., no data transform, swizzle, broadcast).

In the case of a memory access 520 instruction template of class A, the alpha field 552 is interpreted as an eviction hint field 552B, whose content distinguishes which one of the eviction hints is to be used (in FIG. 5A, temporal 552B.1 and non-temporal 552B.2 are respectively specified for the memory access, temporal 525 instruction template and the memory access, non-temporal 530 instruction template), while the beta field 554 is interpreted as a data manipulation field 554C, whose content distinguishes which one of a number of data manipulation operations (also known as primitives) is to be performed (e.g., no manipulation; broadcast; up conversion of a source; and down conversion of a destination). The memory access 520 instruction templates include the scale field 560, and optionally the displacement field 562A or the displacement scale field 562B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 552 is interpreted as a write mask control (Z) field 552C, whose content distinguishes whether the write masking controlled by the write mask field 570 should be a merging or a zeroing.

In the case of the non-memory access 505 instruction templates of class B, part of the beta field 554 is interpreted as an RL field 557A, whose content distinguishes which one of the different augmentation operation types are to be performed (e.g., round 557A.1 and vector length (VSIZE) 557A.2 are respectively specified for the no memory access, write mask control, partial round control type operation 512 instruction template and the no memory access, write mask control, VSIZE type operation 517 instruction template), while the rest of the beta field 554 distinguishes which of the operations of the specified type is to be performed. In the no memory access 505 instruction templates, the scale field 560, the displacement field 562A, and the displacement scale filed 562B are not present.

In the no memory access, write mask control, partial round control type operation 510 instruction template, the rest of the beta field 554 is interpreted as a round operation field 559A and exception event reporting is disabled (a given instruction does not report any kind of floating-point exception flag and does not raise any floating point exception handler). Round operation control field 559A—just as round operation control field 558, its content distinguishes which one of a group of rounding operations to perform (e.g., Round-up, Round-down, Round-towards-zero and Round-to-nearest). Thus, the round operation control field 559A allows for the changing of the rounding mode on a per instruction basis. In one embodiment of the disclosure where a processor includes a control register for specifying rounding modes, the round operation control field's 550 content overrides that register value.

In the no memory access, write mask control, VSIZE type operation 517 instruction template, the rest of the beta field 554 is interpreted as a vector length field 559B, whose content distinguishes which one of a number of data vector lengths is to be performed on (e.g., 128, 256, or 512 byte).

In the case of a memory access 520 instruction template of class B, part of the beta field 554 is interpreted as a broadcast field 557B, whose content distinguishes whether or not the broadcast type data manipulation operation is to be performed, while the rest of the beta field 554 is interpreted the vector length field 559B. The memory access 520 instruction templates include the scale field 560, and optionally the displacement field 562A or the displacement scale field 562B.

With regard to the generic vector friendly instruction format 500, a full opcode field 574 is shown including the format field 540, the base operation field 542, and the data element width field 564. While one embodiment is shown where the full opcode field 574 includes all of these fields, the full opcode field 574 includes less than all of these fields in embodiments that do not support all of them. The full opcode field 574 provides the operation code (opcode).

The augmentation operation field 550, the data element width field 564, and the write mask field 570 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 6 is a block diagram illustrating an exemplary specific vector friendly instruction format according to embodiments of the disclosure. FIG. 6 shows a specific vector friendly instruction format 600 that is specific in the sense that it specifies the location, size, interpretation, and order of the fields, as well as values for some of those fields. The specific vector friendly instruction format 600 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 5 into which the fields from FIG. 6 map are illustrated.

It should be understood that, although embodiments of the disclosure are described with reference to the specific vector friendly instruction format 600 in the context of the generic vector friendly instruction format 500 for illustrative purposes, the disclosure is not limited to the specific vector friendly instruction format 600 except where claimed. For example, the generic vector friendly instruction format 500 contemplates a variety of possible sizes for the various fields, while the specific vector friendly instruction format 600 is shown as having fields of specific sizes. By way of specific example, while the data element width field 564 is illustrated as a one bit field in the specific vector friendly instruction format 600, the disclosure is not so limited (that is, the generic vector friendly instruction format 500 contemplates other sizes of the data element width field 564).

The generic vector friendly instruction format 500 includes the following fields listed below in the order illustrated in FIG. 6A.

EVEX Prefix (Bytes 0-3) 602—is encoded in a four-byte form.

Format Field 540 (EVEX Byte 0, bits [7:0])—the first byte (EVEX Byte 0) is the format field 540 and it contains 0x62 (the unique value used for distinguishing the vector friendly instruction format in one embodiment of the disclosure).

The second-fourth bytes (EVEX Bytes 1-3) include a number of bit fields providing specific capability.

REX field 605 (EVEX Byte 1, bits [7-5])—consists of a EVEX.R bit field (EVEX Byte 1, bit [7]-R), EVEX.X bit field (EVEX byte 1, bit [6]-X), and 557BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 510—this is the first part of the REX' field 510 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 615 (EVEX byte 1, bits [3:0]-mmmm)—its content encodes an implied leading opcode byte (0F, 0F 38, or 0F 3).

Data element width field 564 (EVEX byte 2, bit [7]-W)—is represented by the notation EVEX.W. EVEX.W is used to define the granularity (size) of the datatype (either 32-bit data elements or 64-bit data elements).

EVEX.vvvv 620 (EVEX Byte 2, bits [6:3]-vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 620 encodes the 4 low-order bits of the first source register specifier stored in inverted (1 s complement) form. Depending on the instruction, an extra different EVEX bit field is used to extend the specifier size to 32 registers.

EVEX.0 568 Class field (EVEX byte 2, bit [2]-U)—If EVEX.U=0, it indicates class A or EVEX.U0; if EVEX.U=1, it indicates class B or EVEX.U1.

Prefix encoding field 625 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 552 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 554 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 510—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 570 (EVEX byte 3, bits [2:0]-kkk)—its content specifies the index of a register in the write mask registers as previously described. In one embodiment of the disclosure, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 630 (Byte 4) is also known as the opcode byte. Part of the opcode is specified in this field.

MOD R/M Field 640 (Byte 5) includes MOD field 642, Reg field 644, and R/M field 646. As previously described, the MOD field's 642 content distinguishes between memory access and non-memory access operations. The role of Reg field 644 can be summarized to two situations: encoding either the destination register operand or a source register operand, or be treated as an opcode extension and not used to encode any instruction operand. The role of R/M field 646 may include the following: encoding the instruction operand that references a memory address, or encoding either the destination register operand or a source register operand.

Scale, Index, Base (SIB) Byte (Byte 6)—As previously described, the scale field's 550 content is used for memory address generation. SIB.xxx 654 and SIB.bbb 656—the contents of these fields have been previously referred to with regard to the register indexes Xxxx and Bbbb.

Displacement field 562A (Bytes 7-10)—when MOD field 642 contains 10, bytes 7-10 are the displacement field 562A, and it works the same as the legacy 32-bit displacement (disp32) and works at byte granularity.

Displacement factor field 562B (Byte 7)—when MOD field 642 contains 01, byte 7 is the displacement factor field 562B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 562B is a reinterpretation of disp8; when using displacement factor field 562B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 562B substitutes the legacy x86 instruction set 8-bit displacement. Thus, the displacement factor field 562B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 572 operates as previously described.

Full Opcode Field

FIG. 6B is a block diagram illustrating the fields of the specific vector friendly instruction format 600 that make up the full opcode field 574 according to one embodiment of the disclosure. Specifically, the full opcode field 574 includes the format field 540, the base operation field 542, and the data element width (W) field 564. The base operation field 542 includes the prefix encoding field 625, the opcode map field 615, and the real opcode field 630.

Register Index Field

FIG. 6C is a block diagram illustrating the fields of the specific vector friendly instruction format 600 that make up the register index field 544 according to one embodiment of the disclosure. Specifically, the register index field 544 includes the REX field 605, the REX' field 610, the MODR/M.reg field 644, the MODR/M.r/m field 646, the VVVV field 620, xxx field 654, and the bbb field 656.

Augmentation Operation Field

FIG. 6D is a block diagram illustrating the fields of the specific vector friendly instruction format 600 that make up the augmentation operation field 550 according to one embodiment of the disclosure. When the class (U) field 568 contains 0, it signifies EVEX.U0 (class A 568A); when it contains 1, it signifies EVEX.U1 (class B 568B). When U=0 and the MOD field 642 contains 11 (signifying a no memory access operation), the alpha field 552 (EVEX byte 3, bit [7]-EH) is interpreted as the rs field 552A. When the rs field 552A contains a 1 (round 552A.1), the beta field 554 (EVEX byte 3, bits [6:4]-SSS) is interpreted as the round control field 554A. The round control field 554A includes a one bit SAE field 556 and a two bit round operation field 558. When the rs field 552A contains a 0 (data transform 552A.2), the beta field 554 (EVEX byte 3, bits [6:4]-SSS) is interpreted as a three bit data transform field 554B. When U=0 and the MOD field 642 contains 00, 01, or 10 (signifying a memory access operation), the alpha field 552 (EVEX byte 3, bit [7]-EH) is interpreted as the eviction hint (EH) field 552B and the beta field 554 (EVEX byte 3, bits [6:4]-SSS) is interpreted as a three bit data manipulation field 554C.

When U=1, the alpha field 552 (EVEX byte 3, bit [7]-EH) is interpreted as the write mask control (Z) field 552C. When U=1 and the MOD field 642 contains 11 (signifying a no memory access operation), part of the beta field 554 (EVEX byte 3, bit [4]-$S_0$) is interpreted as the RL field 557A; when it contains a 1 (round 557A.1) the rest of the beta field 554 (EVEX byte 3, bit [6-5]-$S_{2-1}$) is interpreted as the round operation field 559A, while when the RL field 557A contains a 0 (VSIZE 557.A2) the rest of the beta field 554 (EVEX byte 3, bit [6-5]-$S_{2-1}$) is interpreted as the vector length field 559B (EVEX byte 3, bit [6-5]-$L_{1-0}$). When U=1 and the MOD field 642 contains 00, 01, or 10 (signifying a memory access operation), the beta field 554 (EVEX byte 3, bits [6:4]-SSS) is interpreted as the vector length field 559B (EVEX byte 3, bit [6-5]-$L_{1-0}$) and the broadcast field 557B (EVEX byte 3, bit [4]-B).

Exemplary Register Architecture

FIG. 7 is a block diagram of a register architecture 700 according to one embodiment of the disclosure. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 600 operates on these overlaid register file as illustrated in the below tables.

| Adjustable Vector Length | Class | Operations | Registers |
|---|---|---|---|
| Instruction Templates that do not include the vector length field 559B | A (FIG. 5A; U = 0) | 510, 515, 525, 530 | zmm registers (the vector length is 64 byte) |
| | B (FIG. 5B; U = 1) | 512 | zmm registers (the vector length is 64 byte) |
| Instruction templates that do include the vector length field 559B | B (FIG. 5B; U = 1) | 517, 527 | zmm, ymm, or xmm registers (the vector length is 64 byte, 32 byte, or 16 byte) depending on the vector length field 559B |

In other words, the vector length field 559B selects between a maximum length and one or more other shorter lengths, where each such shorter length is half the length of the preceding length; and instructions templates without the vector length field 559B operate on the maximum vector length. Further, in one embodiment, the class B instruction templates of the specific vector friendly instruction format 600 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 715—in the embodiment illustrated, there are 8 write mask registers (k0 through k7), each 64 bits in size. In an alternate embodiment, the write mask registers 715 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 745, on which is aliased the MMX packed integer flat register file 750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the disclosure. FIG. 8B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit, a write mask registers unit, and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
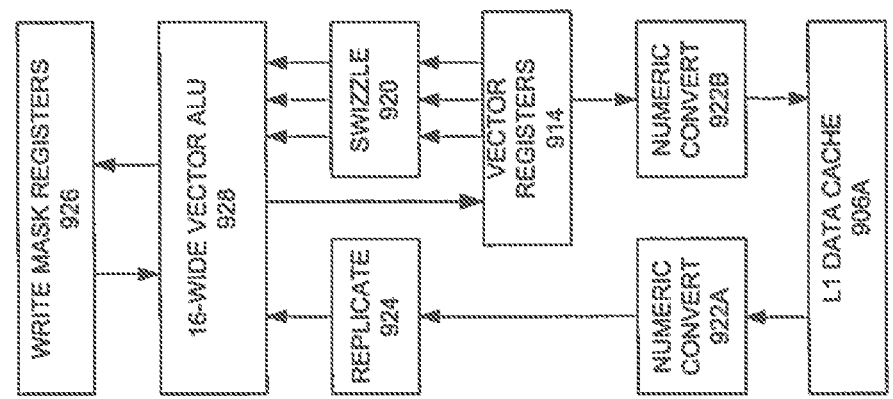
FIG. 9B is an expanded view of part of the processor core in FIG. 9A according to embodiments of the disclosure.
Figure 9A:
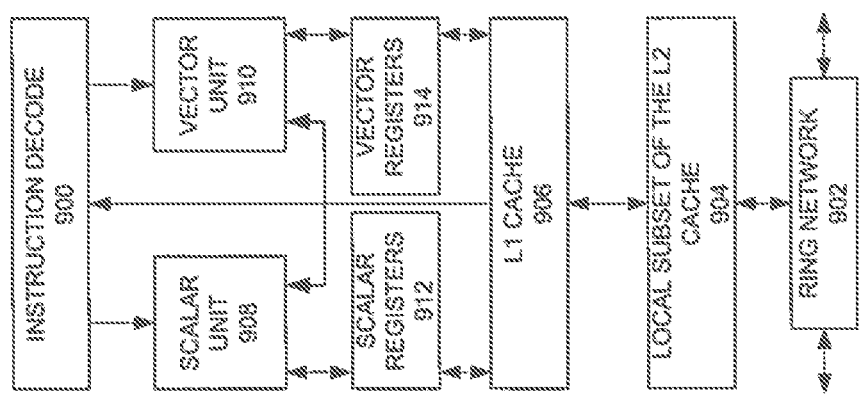
FIG. 9A is a block diagram of a single processor core, along with its connection to the on-die interconnect network and with its local subset of the Level 2 (L2) cache, according to embodiments of the disclosure.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the disclosure. In one embodiment, an instruction decode unit 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the disclosure may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the disclosure. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Figure 10:
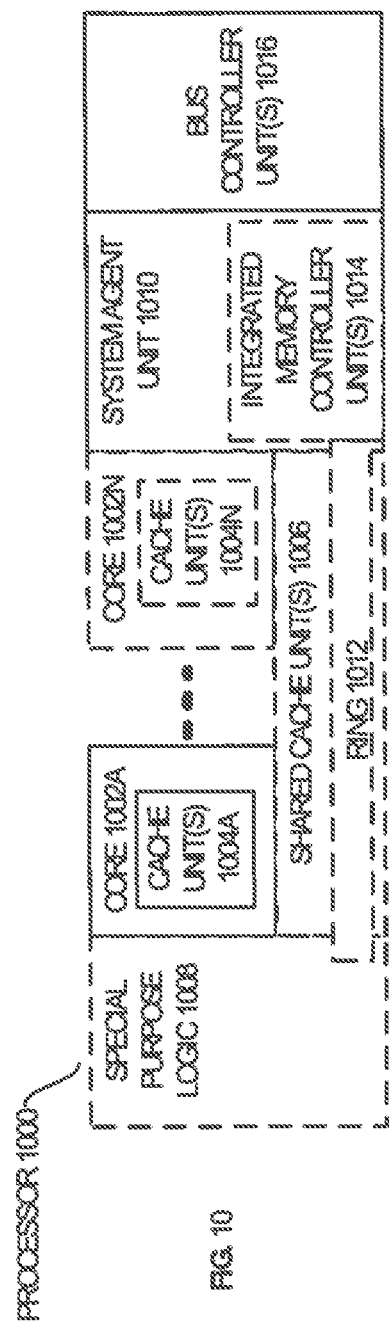
FIG. 10 is a block diagram of a processor that may have more than one core, may have an integrated memory controller, and may have integrated graphics according to embodiments of the disclosure.

FIG. 10 is a block diagram of a processor 1000 that may have more than one core, may have an integrated memory controller, and may have integrated graphics according to embodiments of the disclosure. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
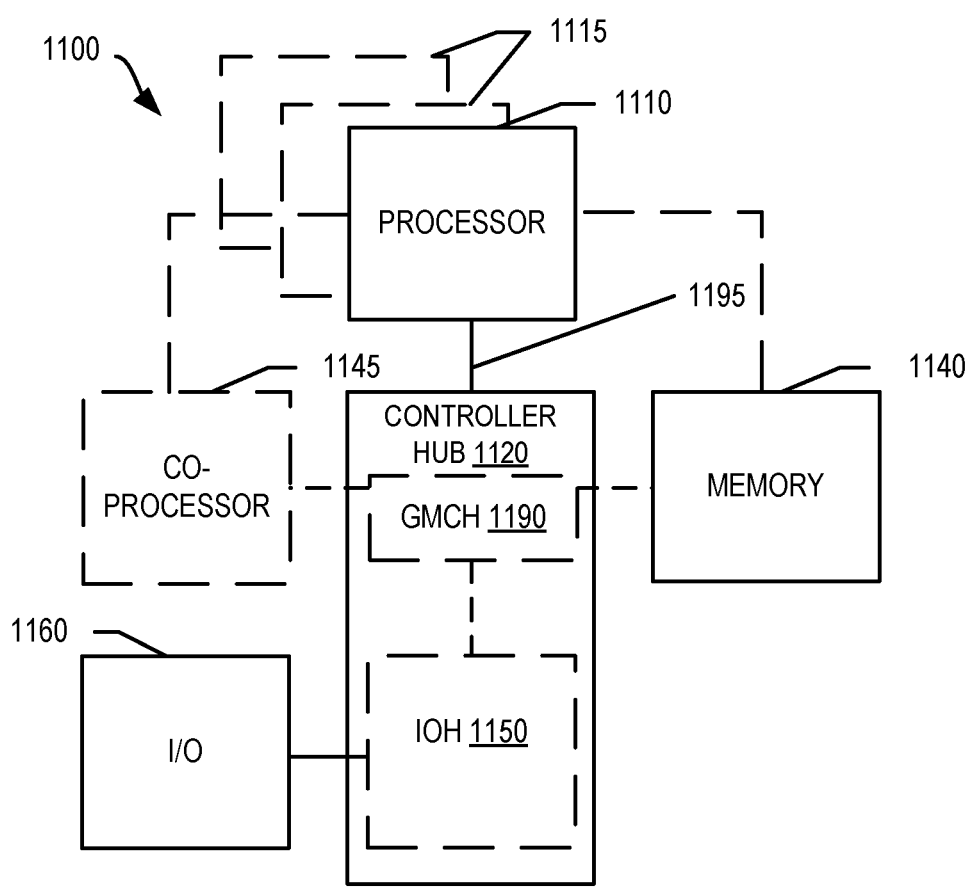
FIG. 11 is a block diagram of a system in accordance with one embodiment of the present disclosure.

Referring now to FIG. 11, shown is a block diagram of a system 1100 in accordance with one embodiment of the present disclosure. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
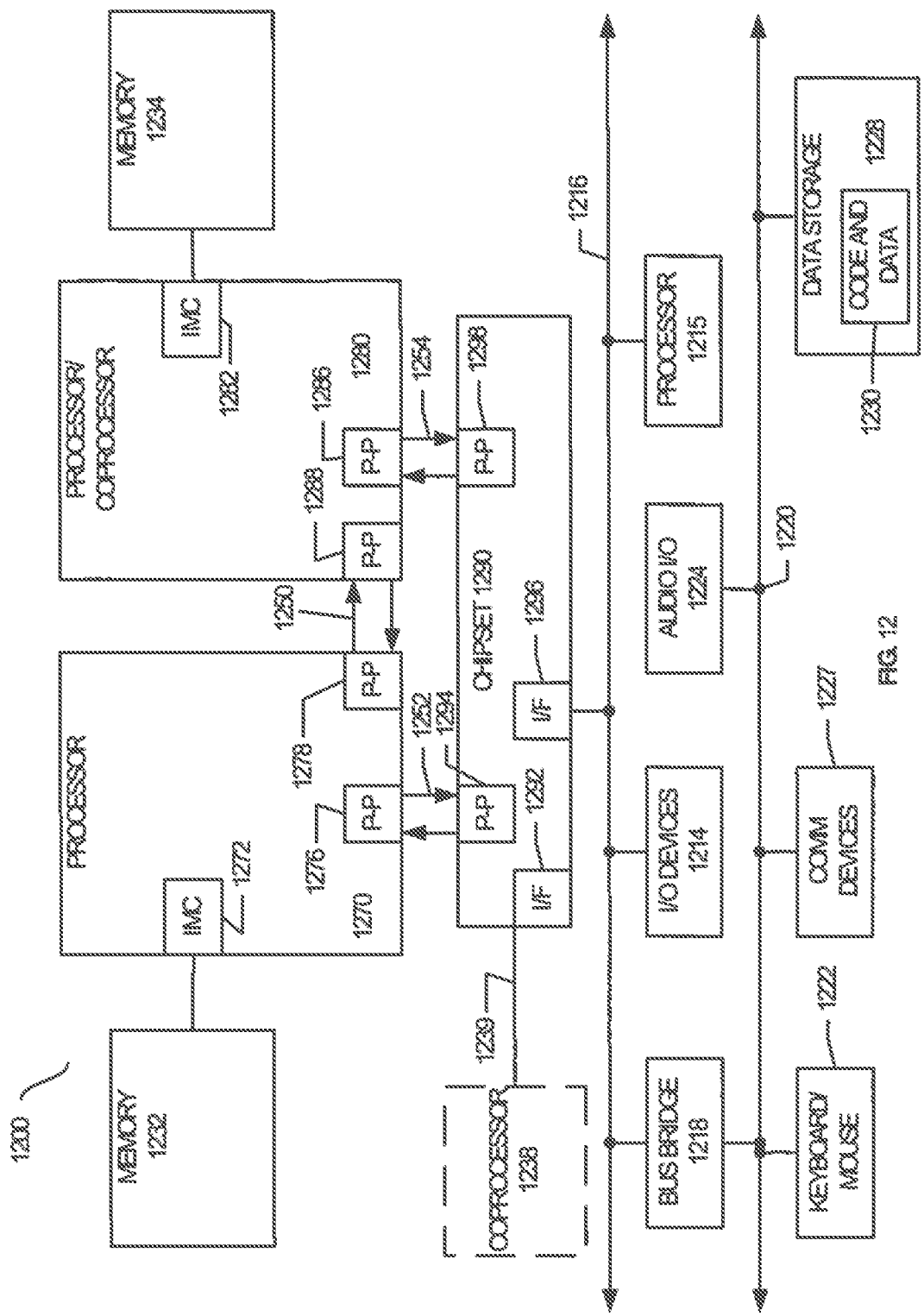
FIG. 12 is a block diagram of a more specific exemplary system in accordance with an embodiment of the present disclosure.

Referring now to FIG. 12, shown is a block diagram of a first more specific exemplary system 1200 in accordance with an embodiment of the present disclosure. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the disclosure, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present disclosure is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
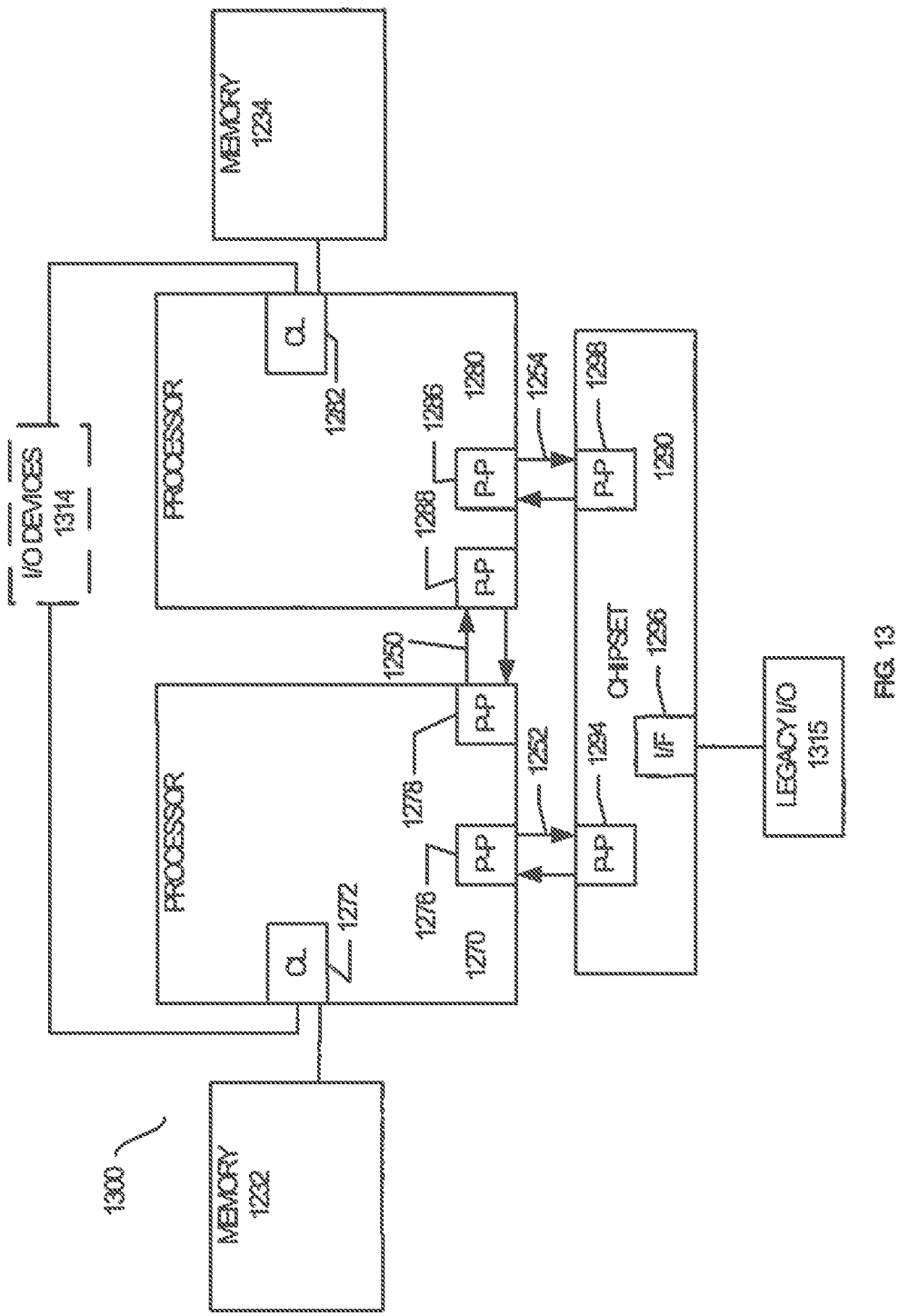
FIG. 13, shown is a block diagram of a second more specific exemplary system in accordance with an embodiment of the present disclosure.

Referring now to FIG. 13, shown is a block diagram of a second more specific exemplary system 1300 in accordance with an embodiment of the present disclosure Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
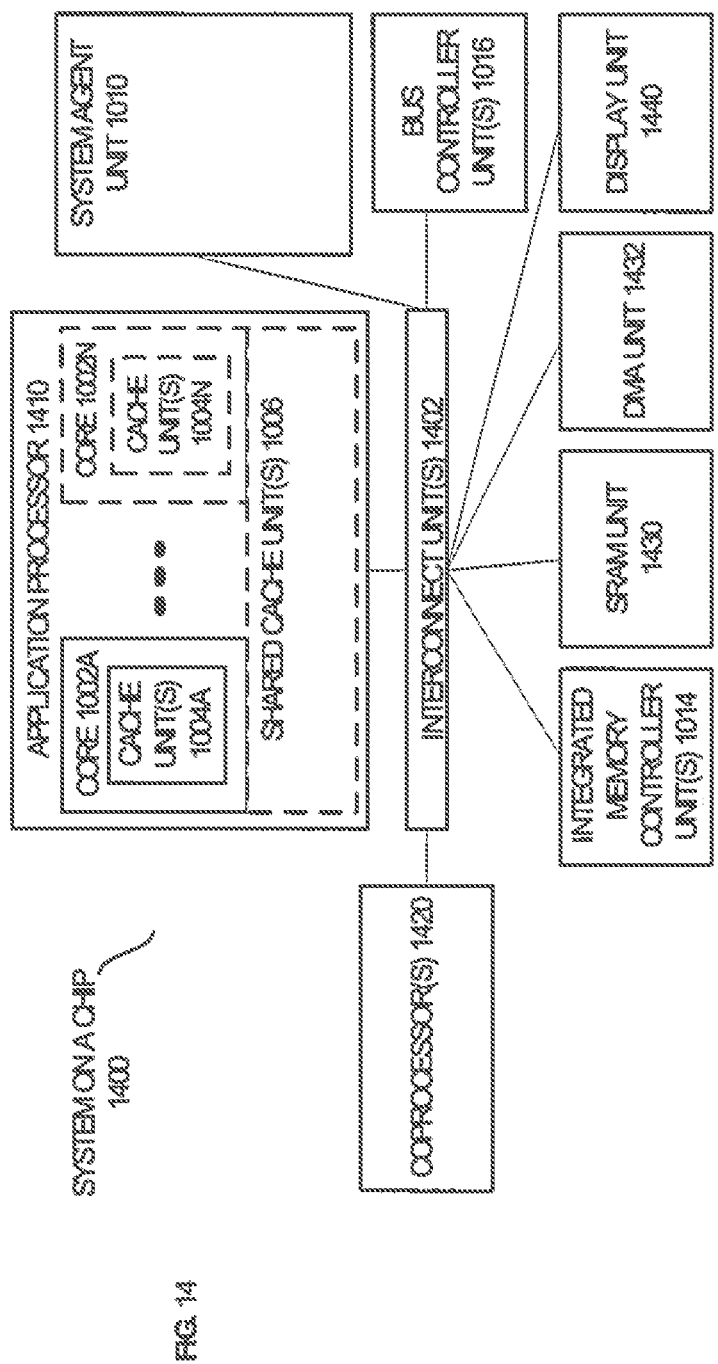
FIG. 14, shown is a block diagram of a system on a chip (SoC) in accordance with an embodiment of the present disclosure.

Referring now to FIG. 14, shown is a block diagram of a SoC 1400 in accordance with an embodiment of the present disclosure. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
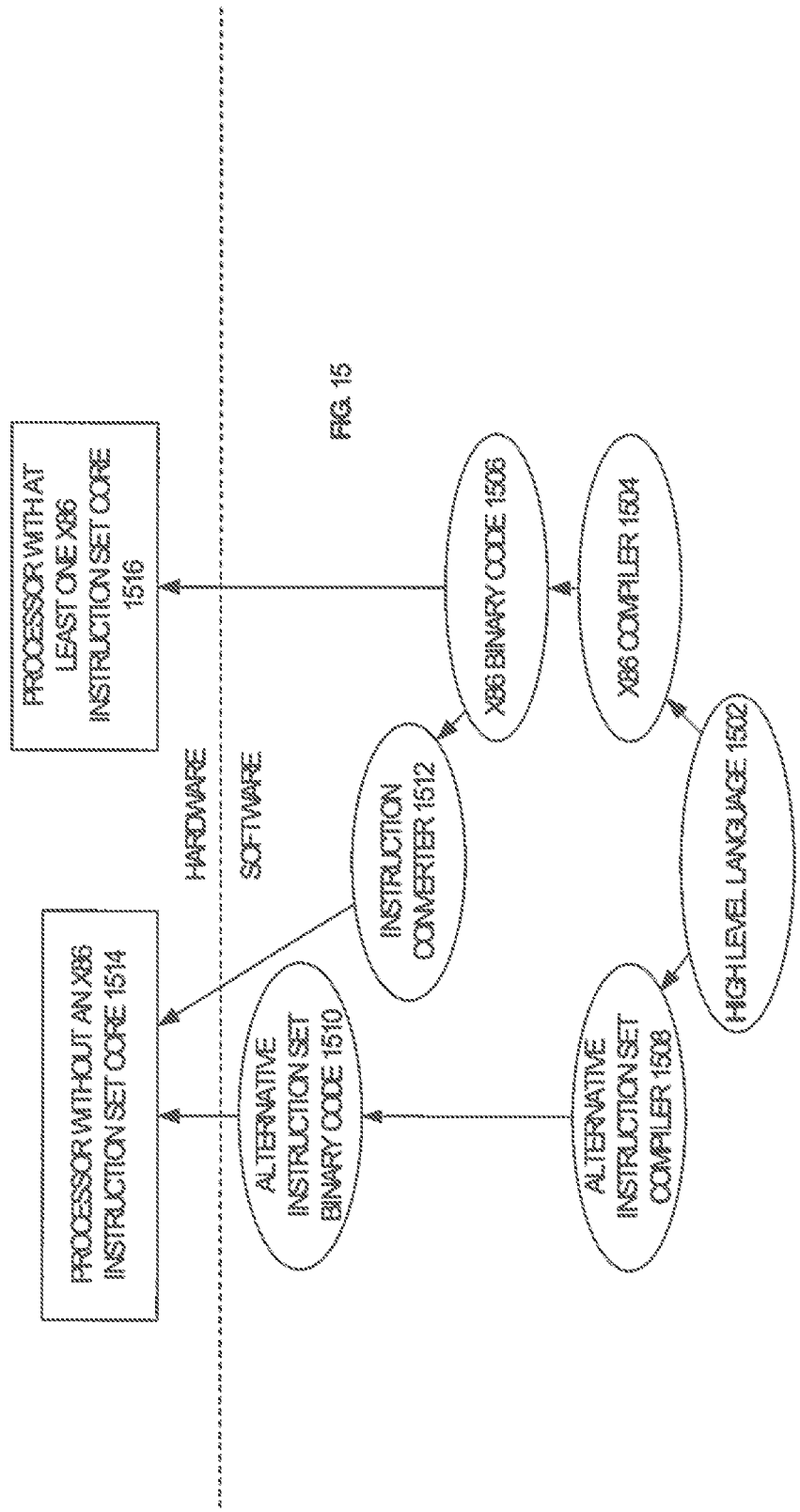
FIG. 15 is a block diagram contrasting the use of a software instruction converter to convert binary instructions in a source instruction set to binary instructions in a target instruction set according to embodiments of the disclosure.

FIG. 15 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

What is claimed is:

1. A hardware processor comprising:
a decode unit to decode a single instruction with a register operand and an elemental offset to cause:
access of a first element of a plurality of elements in a register specified by the register operand, and
access of a second element of a plurality of elements in a next register, wherein the second element is specified by the elemental offset; and
an execution unit to execute the single instruction to perform an operation on a first input and a second input to produce a resultant of the single instruction based on the first input and the second input, wherein the first input is a combination of the first element and the second element.

2. The hardware processor of claim 1, wherein the next register is a next logical register from the register specified by the register operand.

3. The hardware processor of claim 2, further comprising a multiple ported, banked register file that includes the register and the next logical register.

4. The hardware processor of claim 1, wherein the decode unit is to cause the accesses of the first element and the second element simultaneously.

5. The hardware processor of claim 1, wherein the next register is specified by a second register operand of the single instruction.

6. The hardware processor of claim 1, further comprising:
a banked register file that includes the register and the next register; and
bank logic circuitry to access the first element and the second element from the banked register file based on at least one control value sent by the decode unit.

7. The hardware processor of claim 1, wherein the register and the next register have a same total number of elements and a same size of each element.

8. The hardware processor of claim 1, wherein the decode unit is to cause output of the first element and the second element to the execution unit without an output of the first element or the second element back into a register file comprising the register and the next register.

9. A method comprising:
decoding, with a decode unit of a processor, a single instruction with a register operand and an elemental offset to cause:
access of a first element of a plurality of elements in a register specified by the register operand, and
access of a second element of a plurality of elements in a next register, wherein the second element is specified by the elemental offset; and
executing the single instruction with an execution unit of the processor to perform an operation on a first input and a second input to produce a resultant of the single instruction based on the first input and the second input, wherein the first input is a combination of the first element and the second element.

10. The method of claim 9, wherein the next register is a next logical register from the register specified by the register operand.

11. The method of claim 10, wherein the access of the first element and the access of the second element each comprise accessing a multiple ported, banked register file that includes the register and the next logical register.

12. The method of claim 9, wherein the access of the first element is simultaneous with the access of the second element.

13. The method of claim 9, wherein the next register is specified by a second register operand of the single instruction.

14. The method of claim 9, wherein the access of the first element and the access of the second element each comprises accessing a banked register file that includes the first element in the register and the second element in the next register based on at least one control value sent by the decode unit.

15. The method of claim 9, wherein the register and the next register have a same total number of elements and a same size of each element.

16. The method of claim 9, further comprising outputting the first element and the second element to the execution unit without outputting the first element or the second element back into a register file comprising the register and the next register.

17. A non-transitory machine readable medium that stores code that when executed by a machine causes the machine to perform a method comprising:
decoding, with a decode unit of a processor, a single instruction with a register operand and an elemental offset to cause:
access of a first element of a plurality of elements in a register specified by the register operand, and
access of a second element of a plurality of elements in a next register, wherein the second element is specified by the elemental offset; and
executing the single instruction with an execution unit of the processor to perform an operation on a first input and a second input to produce a resultant of the single instruction based on the first input and the second input, wherein the first input is a combination of the first element and the second element.

18. The non-transitory machine readable medium of claim 17, wherein the next register is a next logical register from the register specified by the register operand.

19. The non-transitory machine readable medium of claim 18, wherein the access of the first element and the access of the second element each comprise accessing a multiple ported, banked register file that includes the register and the next logical register.

20. The non-transitory machine readable medium of claim 17, wherein the access of the first element is simultaneous with the access of the second element.

21. The non-transitory machine readable medium of claim 17, wherein the next register is specified by a second register operand of the single instruction.

22. The non-transitory machine readable medium of claim 17, wherein the access of the first element and the access of the second element each comprises accessing a banked register file that includes the first element in the register and the second element in the next register based on at least one control value sent by the decode unit.

23. The non-transitory machine readable medium of claim 17, wherein the register and the next register have a same total number of elements and a same size of each element.

24. The non-transitory machine readable medium of claim 17, further comprising outputting the first element and the second element to the execution unit without outputting the first element or the second element back into a register file comprising the register and the next register.

* * * * *